United States Patent
Irie

(10) Patent No.: US 10,704,900 B2
(45) Date of Patent: Jul. 7, 2020

(54) DETECTION DEVICE AND DETECTION METHOD

(71) Applicant: MITSUBISHI ELECTRIC CORPORATION, Chiyoda-ku, Tokyo (JP)

(72) Inventor: Megumi Irie, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 81 days.

(21) Appl. No.: 16/064,349

(22) PCT Filed: Aug. 10, 2016

(86) PCT No.: PCT/JP2016/073615
§ 371 (c)(1),
(2) Date: Jun. 20, 2018

(87) PCT Pub. No.: WO2017/119154
PCT Pub. Date: Jul. 13, 2017

(65) Prior Publication Data
US 2019/0003830 A1   Jan. 3, 2019

(30) Foreign Application Priority Data
Jan. 7, 2016  (JP) .................... 2016-001994

(51) Int. Cl.
*G01B 11/30* (2006.01)
*G06T 1/00* (2006.01)
(Continued)

(52) U.S. Cl.
CPC ............. *G01B 11/30* (2013.01); *G01N 21/88* (2013.01); *G01N 21/954* (2013.01); *G01S 13/88* (2013.01);
(Continued)

(58) Field of Classification Search
CPC ....... G01B 11/30; G01N 21/88; G01N 21/954
(Continued)

(56) References Cited

U.S. PATENT DOCUMENTS

| | | | |
|---|---|---|---|
| 2008/0195330 A1* | 8/2008 | Hara ................... | G01N 21/8851 702/40 |
| 2014/0184786 A1* | 7/2014 | Georgeson ......... | G01N 21/8851 348/128 |
| 2016/0274060 A1* | 9/2016 | Denenberg ......... | G01N 27/9046 |

FOREIGN PATENT DOCUMENTS

| | | |
|---|---|---|
| JP | 2002-257744 A | 9/2002 |
| JP | 4588901 B2 | 12/2010 |

(Continued)

OTHER PUBLICATIONS

International Search Report (PCT/ISA/210) dated Oct. 18, 2016, by the Japan Patent Office as the International Searching Authority for International Application No. PCT/JP2016/073615.
(Continued)

*Primary Examiner* — Hung Nguyen
(74) *Attorney, Agent, or Firm* — Buchanan Ingersoll & Rooney PC

(57) ABSTRACT

A detection device includes: a crack detection unit to detect a deformation on a surface of a structure from image information on the structure; a step detection unit to detect a step on the surface of the structure from three-dimensional point group information on the structure measured with a laser; and a determination unit to determine a state of the deformation using information on the deformation generated by the crack detection unit and information on the step generated by the step detection unit.

14 Claims, 32 Drawing Sheets

(51) Int. Cl.
    *G01N 21/954*    (2006.01)
    *G01N 21/88*     (2006.01)
    *G06T 7/00*      (2017.01)
    *G01S 13/88*     (2006.01)
    *G06T 1/60*      (2006.01)

(52) U.S. Cl.
    CPC .................. *G06T 1/00* (2013.01); *G06T 1/60* (2013.01); *G06T 7/0004* (2013.01); *G06T 2207/10028* (2013.01)

(58) Field of Classification Search
    USPC ...................................................... 356/237.2
    See application file for complete search history.

(56) References Cited

FOREIGN PATENT DOCUMENTS

| | | |
|---|---|---|
| JP | 2012-220471 A | 11/2012 |
| JP | 5795850 B2 | 10/2015 |

OTHER PUBLICATIONS

Written Opinion (PCT/ISA/237) dated Oct. 18, 2016, by the Japan Patent Office as the International Searching Authority for International Application No. PCT/JP2016/073615.

\* cited by examiner

α, β, γ :PIXELS WITH ON CRACK FLAGS

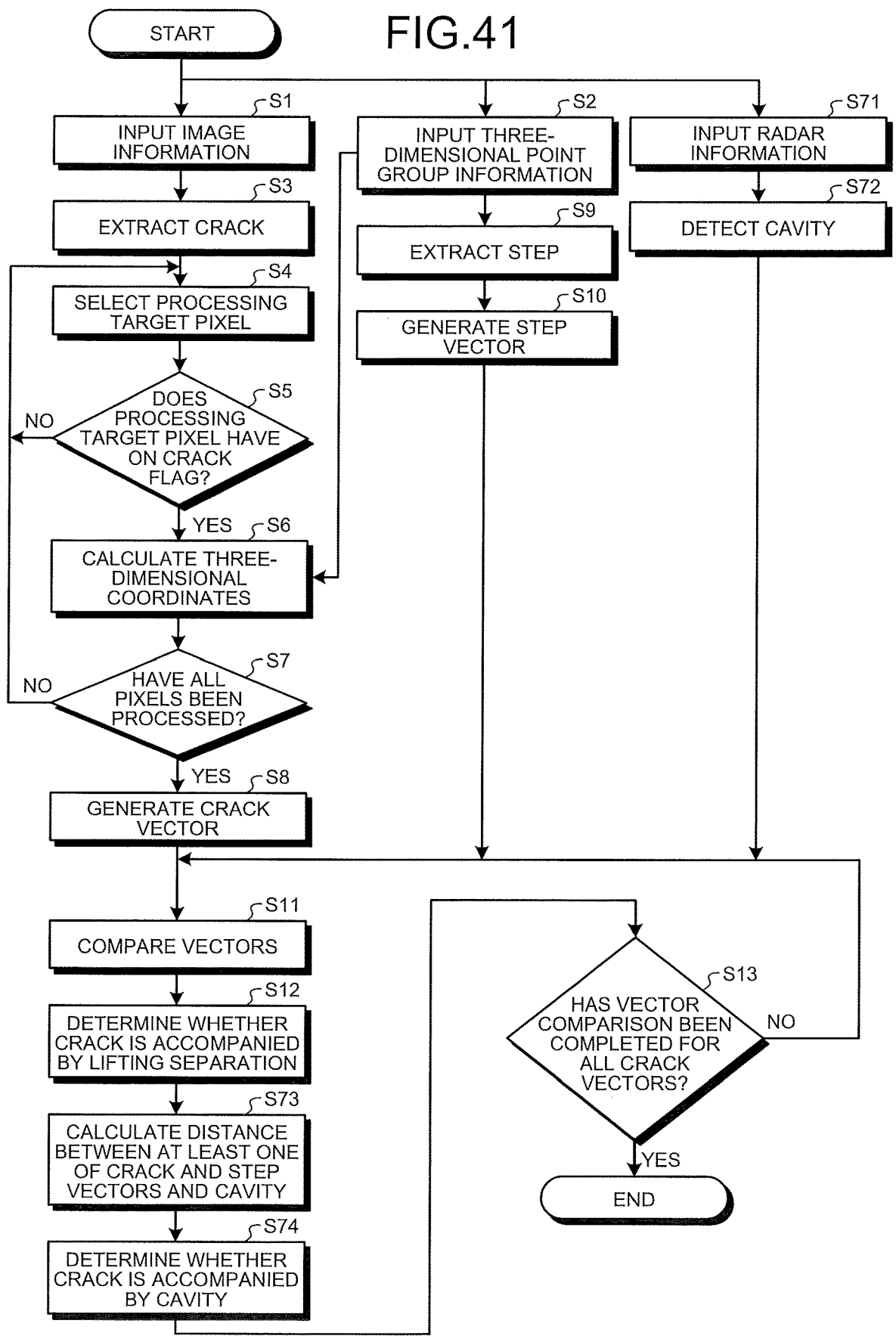

DETECTION DEVICE AND DETECTION METHOD

FIELD

The present invention relates to a detection device and a detection method for detecting a deformation of an inspection target.

BACKGROUND

There have been various techniques for detecting deformations such as cracks and lifts generated on a structure to be inspected. Patent Literature 1 discloses a technique for diagnosing cracks or the like by combining measurement results obtained using various instruments such as an image instrument, an infrared ray detector, and a non-contact type electromagnetic wave radar as well as diagnostic results obtained using a hammering method, a visual check method, or the like. Patent Literature 2 discloses a technique for diagnosing cracks or the like by superimposing visible and infrared images of an inspection target.

CITATION LIST

Patent Literature

Patent Literature 1: Japanese Patent No. 4588901
Patent Literature 2: Japanese Patent No. 5795850

SUMMARY

Technical Problem

However, according to the above-described conventional techniques, the hammering method and the visual check method require a large amount of work time by human power, and require a determination process of distinguishing abnormal parts from normal parts or distinguishing abnormal sounds from normal sounds. This causes a problem in that the accuracy of detecting cracks or the like depends on the experience and skill of the investigator. The technique of utilizing infrared images is used to capture differences in the surface temperature of an inspection target and specify a deformed portion on the basis of the differences in surface temperature. However, this technique also has a problem of an influence of differences in received heat amount or heat transfer due to irregularities on a structure surface, resulting in low accuracy. That is, this technique does not depend on the experience and skill of the investigator but is difficult to accurately detect a cracked state.

The present invention has been made in view of the above, and an object thereof is to obtain a detection device that can have an improved accuracy of detecting a cracked state.

Solution to Problem

In order to solve the above-mentioned problems and to achieve the object, a detection device according to an aspect of the present invention includes a deformation detection unit to detect a deformation on a surface of a structure from image information on the structure. Moreover, the detection device includes a step detection unit to detect a step on the surface of the structure from three-dimensional point group information on the structure measured with a laser. Furthermore, the detection device includes a determination unit to determine a state of the deformation using information on the deformation generated by the deformation detection unit and information on the step generated by the step detection unit.

Advantageous Effects of Invention

According to the present invention, an effect is obtained where the accuracy of detecting a cracked state can be improved.

BRIEF DESCRIPTION OF DRAWINGS

FIG. 41 is a flowchart illustrating a process of the detection device to determine the state of a detected crack according to the seventh embodiment.

DESCRIPTION OF EMBODIMENTS

Hereinafter, a detection device and a detection method according to embodiments of the present invention will be described in detail on the basis of the drawings. The present invention is not limited to the embodiments.

First Embodiment

Figure 1:
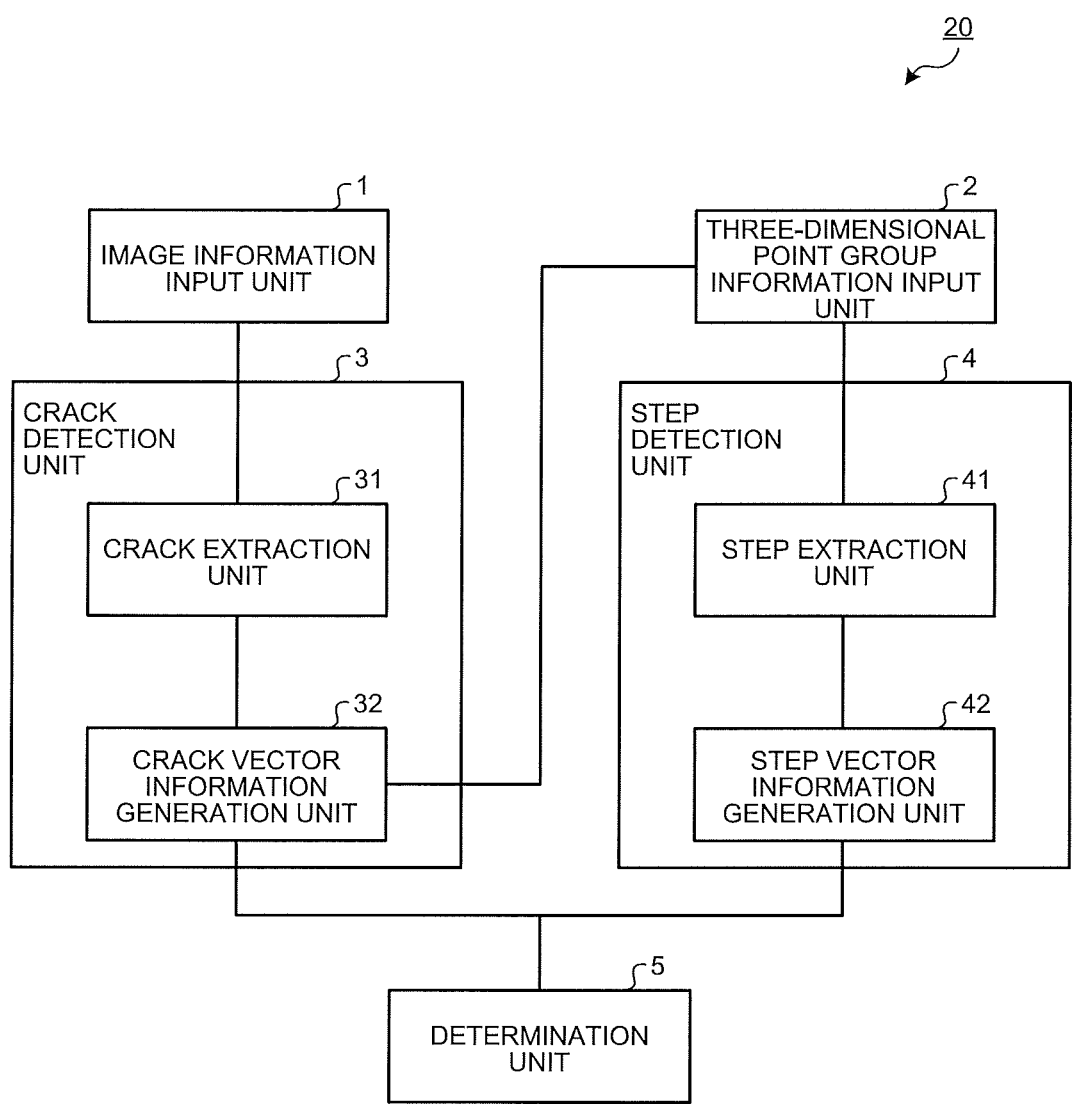
FIG. 1 is a block diagram illustrating an exemplary configuration of a detection device according to a first embodiment.

FIG. 1 is a block diagram illustrating an exemplary configuration of a detection device 20 according to a first embodiment of the present invention. The detection device 20 includes an image information input unit 1, a three-dimensional point group information input unit 2, a crack detection unit 3, a step detection unit 4, and a determination unit 5. The detection device 20 is a device that detects a deformation on the surface of a structure that is an inspection target. Examples of deformations include cracks, dirt, precipitates, and water leaks. The description of the present embodiment is based on the assumption that deformations are cracks, and the same applies to the subsequent embodiments. The detection device 20 detects a crack that is a deformation on a structure surface, and determines whether the detected crack is a crack only on the surface of the structure or a crack accompanied by lifting separation or the like inside the structure. The detection device 20 does not necessarily detect only cracks as deformations, and can be applied to the detection of other deformations.

The image information input unit 1 receives an input of image information on the surface of a structure. For example, the image information input unit 1 receives an input of image information that is digitally captured with a digital camera or the like and can be subjected to image processing, and the image information input unit 1 may be a digital camera itself. The image information input unit 1 may be a data reading device that reads data on image information captured with a digital camera or the like via a recording medium, or a communication device that receives image information captured with a digital camera or the like by wired communication or wireless communication.

The three-dimensional point group information input unit 2 receives an input of three-dimensional point group information on the surface of a structure. The three-dimensional point group information input unit 2 receives an input of point group information having three-dimensional coordinates measured and acquired with a high-density laser scanner, and the three-dimensional point group information input unit 2 may be a high-density laser scanner itself. The three-dimensional point group information input unit 2 may be a data reading device that reads data on three-dimensional point group information measured and acquired with a high-density laser scanner via a recording medium, or a communication device that receives three-dimensional point group information measured and acquired with a high-density laser scanner by wired communication or wireless communication.

The crack detection unit 3 is a deformation detection unit and detects a deformation on the surface of a structure from the image information on the structure. The crack detection unit 3 includes a crack extraction unit 31 and a crack vector information generation unit 32.

The crack extraction unit 31 is a deformation extraction unit, and analyzes image information input to the image information input unit 1 and extracts a deformation on the structure surface, more specifically a crack, from the image information. The crack extraction unit 31 analyzes input image information to extract a crack by using a technique of image processing such as binarization processing and edge detection processing. The crack extraction unit 31 adds a crack flag indicating a crack to a pixel of the extracted crack to generate crack image information. Note that the aforementioned technique of image processing is merely an example, and the present invention is not limited thereto.

The crack vector information generation unit 32 is a deformation vector information generation unit and uses three-dimensional point group information input to the three-dimensional point group information input unit 2 to add three-dimensional coordinates to image information on the crack extracted by the crack extraction unit 31 and vectorize the image information. Specifically, the crack vector information generation unit 32 calculates, for each pixel of the crack image information generated by the crack extraction unit 31, three-dimensional absolute coordinates on the structure surface on the basis of the information on the three-dimensional positional coordinates indicating the optical center position of the camera at the time of capturing the image information, information on the camera pose in three axial directions, and three-dimensional point group information input from the three-dimensional point group information input unit 2, thereby obtaining three-dimensional information about the crack image information.

The crack vector information generation unit 32 groups cracks in a specified certain space with respect to the three-dimensional information on crack image information, and combines points in the same group in each certain space into a line segment using a technique such as linear approximation that utilizes the method of least squares, thereby generating three-dimensional crack vector information. When the distance between end points of a plurality of line segments generated is less than a specified distance, the crack vector information generation unit 32 connects the end points to each other and stores them as the same crack vector information.

The step detection unit 4 detects a step on the surface of a structure from the three-dimensional point group information on the structure measured with a laser. The step detection unit 4 includes a step extraction unit 41 and a step vector information generation unit 42.

The step extraction unit 41 extracts a minute step on the surface of a structure from three-dimensional point group information. The minute step is, for example, a step having a height difference of about 1 mm. For example, the step extraction unit 41 approximates the surface of a structure as a smooth surface using smoothing processing, calculates positional coordinates of each point in the vertical direction with respect to the approximate structure surface, and extracts, as an irregular portion, each point separated from the approximate structure surface by a specified distance or more. The step extraction unit 41 determines the extracted irregular portion as a step, and adds a step flag indicating a step portion to each point constituting the step, thereby generating the three-dimensional point group information on the step. Note that the processing technique for detecting a step from three-dimensional point group information mentioned here is merely an example, and the present invention is not limited thereto. The size of a step is not limited to a height difference of about 1 mm.

The step vector information generation unit 42 vectorizes the three-dimensional point group information on a step extracted by the step extraction unit 41. The step vector information generation unit 42 groups points in a specified certain space with respect to the three-dimensional point group information on a step extracted by the step extraction unit 41, and combines points in the same group in each certain space into a line segment using a technique such as linear approximation that utilizes the method of least squares, thereby generating three-dimensional step vector information. When the distance between end points of a plurality of line segments generated is less than a specified distance, the step vector information generation unit 42 connects the end points to each other and stores them as the same step vector information.

The determination unit 5 determines the state of a crack generated on the surface of a structure using crack vector information that is information on a deformation generated by the crack vector information generation unit 32 and step vector information that is information on a step generated by the step vector information generation unit 42. Specifically, the determination unit 5 calculates the distance between each line segment of the crack vector indicated by three-dimensional crack vector information generated by the crack vector information generation unit 32 of the crack detection unit 3 and the nearest line segment of the line segments of the step vector indicated by three-dimensional step vector information generated by the step vector information generation unit 42 of the step detection unit 4. When the ratio of points having an inter-segment distance between a single crack vector and a corresponding step vector less than a specified value is equal to or greater than a threshold value, the determination unit 5 determines that the crack corresponding to the crack vector is accompanied by lifting separation, that is, the safety of the crack is low.

Instead of performing determination based on the distance between line segments of three-dimensional crack and step vectors, the determination unit 5 may project a structure surface onto a two-dimensional plane to perform determination on the basis of the positional relation on the two-dimensional plane between two-dimensional crack and step vectors, that is, on the basis of the distance on the two-dimensional plane. A method for projecting a structure surface onto a two-dimensional plane includes, for example, generating a two-dimensional developed figure, but the present invention is not limited thereto.

Figure 2:
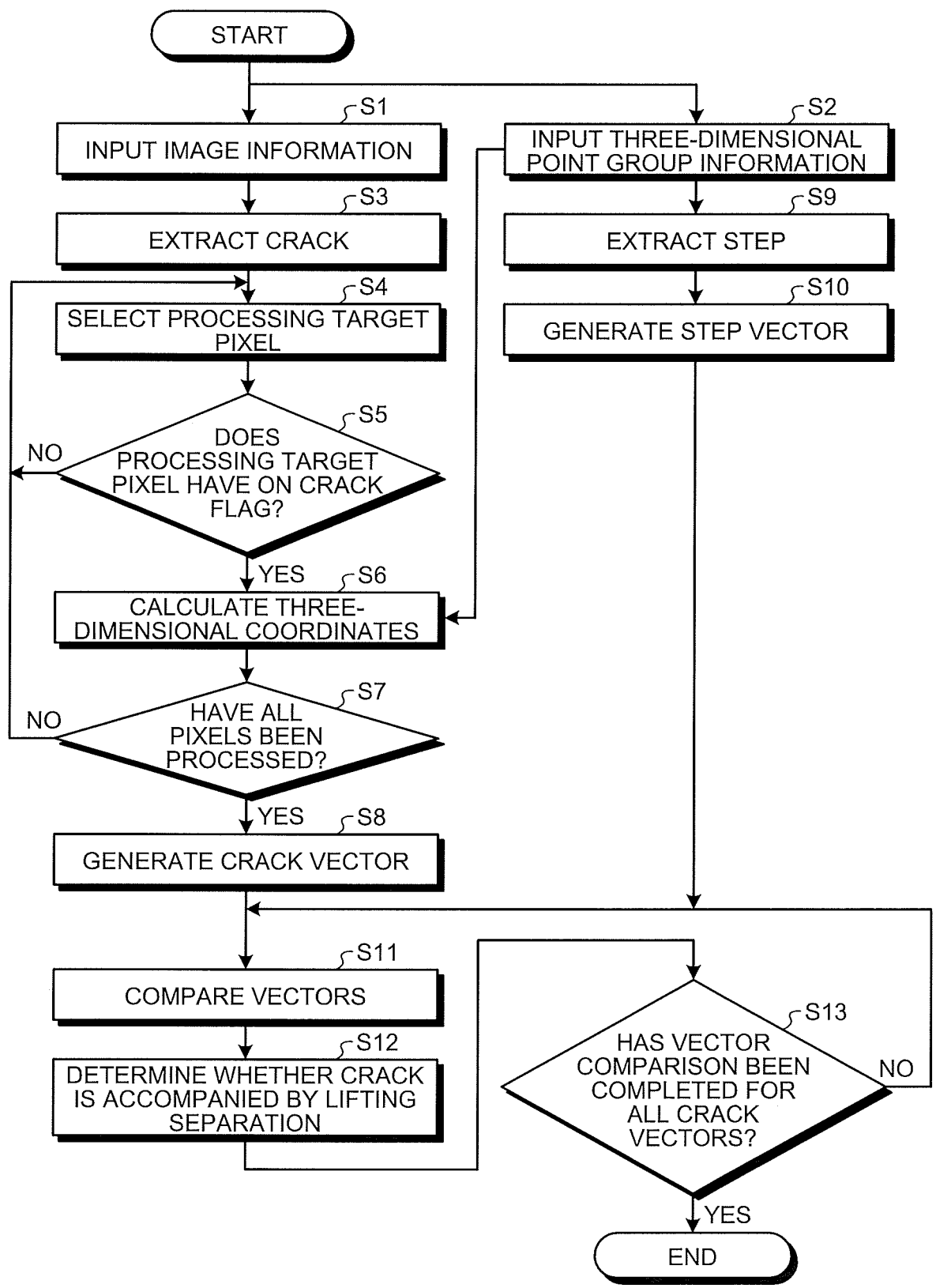
FIG. 2 is a flowchart illustrating a process of the detection device to determine the state of a detected crack according to the first embodiment.

Next, a description will be given of a process of the detection device 20 to determine whether a deformation detected on the surface of a structure is merely a crack or a crack accompanied by lifting separation. FIG. 2 is a flowchart illustrating a process of the detection device 20 to determine the state of a detected crack according to the first embodiment.

Figure 3:
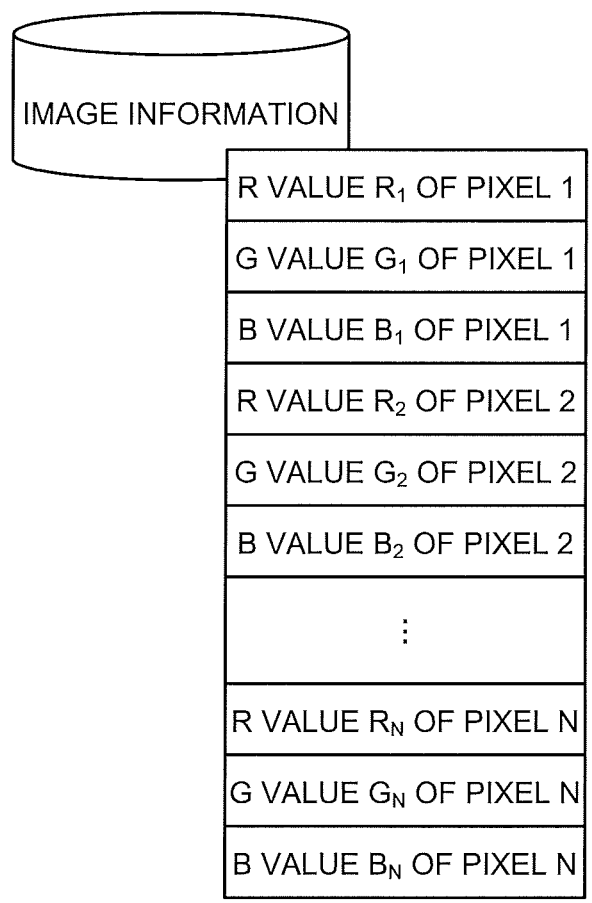
FIG. 3 is a diagram illustrating the content of image information input to an image information input unit according to the first embodiment.

First, the image information input unit 1 of the detection device 20 receives an input of image information on the surface of a structure captured with a digital camera or the like (step S1). FIG. 3 is a diagram illustrating the content of image information input to the image information input unit 1 according to the first embodiment. The image information includes red (R), green (G), and blue (B) values for each pixel. The image information illustrated in FIG. 3 may be stored in a storage unit inside the image information input unit 1, or may be stored in an external storage unit (not illustrated).

Figure 4:
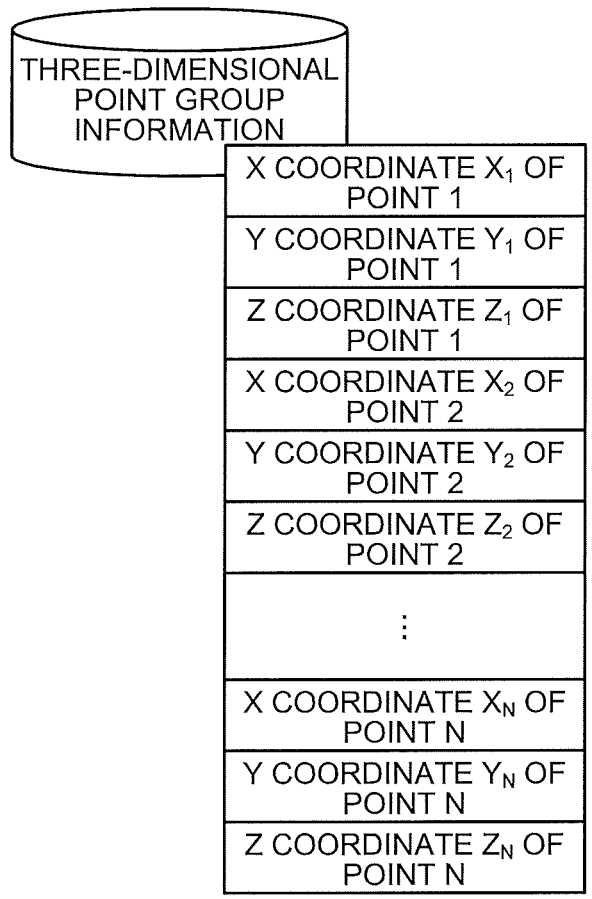
FIG. 4 is a diagram illustrating the content of three-dimensional point group information input to a three-dimensional point group information input unit according to the first embodiment.

The three-dimensional point group information input unit 2 of the detection device 20 receives an input of three-dimensional point group information measured with a laser at the same timing as capturing the image information (step S2). FIG. 4 is a diagram illustrating the content of three-dimensional point group information input to the three-dimensional point group information input unit 2 according to the first embodiment. The three-dimensional point group information includes X, Y, and Z coordinates for each point. The three-dimensional point group information illustrated in FIG. 4 may be stored in a storage unit inside the three-dimensional point group information input unit 2, or may be stored in an external storage unit (not illustrated).

With regard to the X, Y, and Z coordinates, for example, the XY axis can be taken on the horizontal plane and the Z axis can be taken in the height direction by using the plane orthogonal coordinate system. Alternatively, another coordinate system may be used in which a given point is set as the origin and the eastward, northward, and vertically upward directions are respectively set as the X, Y, and Z axis directions, for example. For units of data indicating the coordinate values of each point, meters (m) or the like can be used, but the present invention is not limited thereto. For image information and three-dimensional point group information, for example, information measured with a mobile mapping system (MMS) can be used. The MMS can accurately measure the position and attitude of a vehicle equipped with a measuring device, such as a digital camera and a laser, using the global positioning system (GPS), an inertial navigation device, and the like. Therefore, the MMS can accurately acquire the position of a structure by adding the position of the structure or the like measured with the laser to the position of the vehicle.

Figure 5:
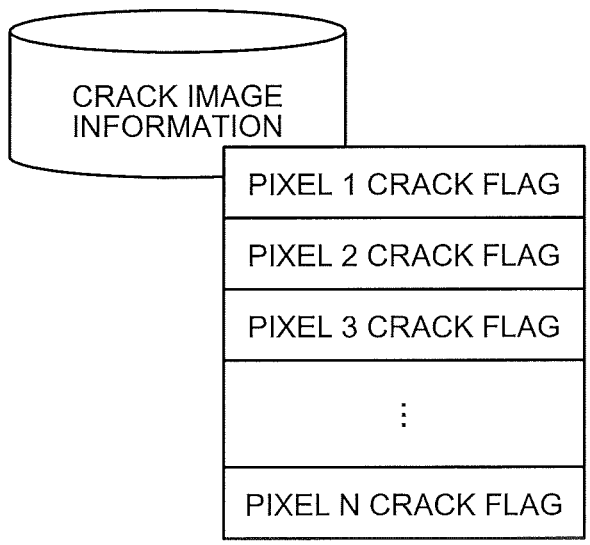
FIG. 5 is a diagram illustrating the content of crack image information extracted by a crack extraction unit according to the first embodiment.

With reference back to the description of the flowchart of FIG. 2, the crack extraction unit 31 of the crack detection unit 3 analyzes the image information input from the image information input unit 1, and extracts a crack from the image information (step S3). The crack extraction unit 31 stores pixels of the crack portion in association with crack flags with ON information indicating a crack. FIG. 5 is a diagram illustrating the content of crack image information extracted by the crack extraction unit 31 according to the first embodiment. In the image information illustrated in FIG. 5, pixels having crack flags with ON information constitute image information indicating a crack. In the image information illustrated in FIG. 5, OFF information is added to the crack flags for pixels from which no crack is extracted. The crack image information illustrated in FIG. 5 may be stored in a storage unit inside the crack extraction unit 31, or may be stored in an external storage unit (not illustrated).

The crack vector information generation unit 32 calculates three-dimensional coordinates corresponding to each pixel for all the pixels with ON crack flags in the crack image information (steps S4 to S7). Specifically, the crack vector information generation unit 32 selects one processing target pixel from the image information illustrated in FIG. 3 (step S4). The crack vector information generation unit 32 checks the crack image information illustrated in FIG. 5, and checks whether the processing target pixel has an ON crack flag (step S5). When the crack flag is OFF (step S5: No), the crack vector information generation unit 32 returns to step S4 to select the next processing target pixel from the image information illustrated in FIG. 3 (step S4). When the crack flag is ON (step S5: Yes), the crack vector information generation unit 32 calculates the three-dimensional coordinates of the pixel with the ON crack flag on the basis of the three-dimensional point group information (step S6).

Figure 6:
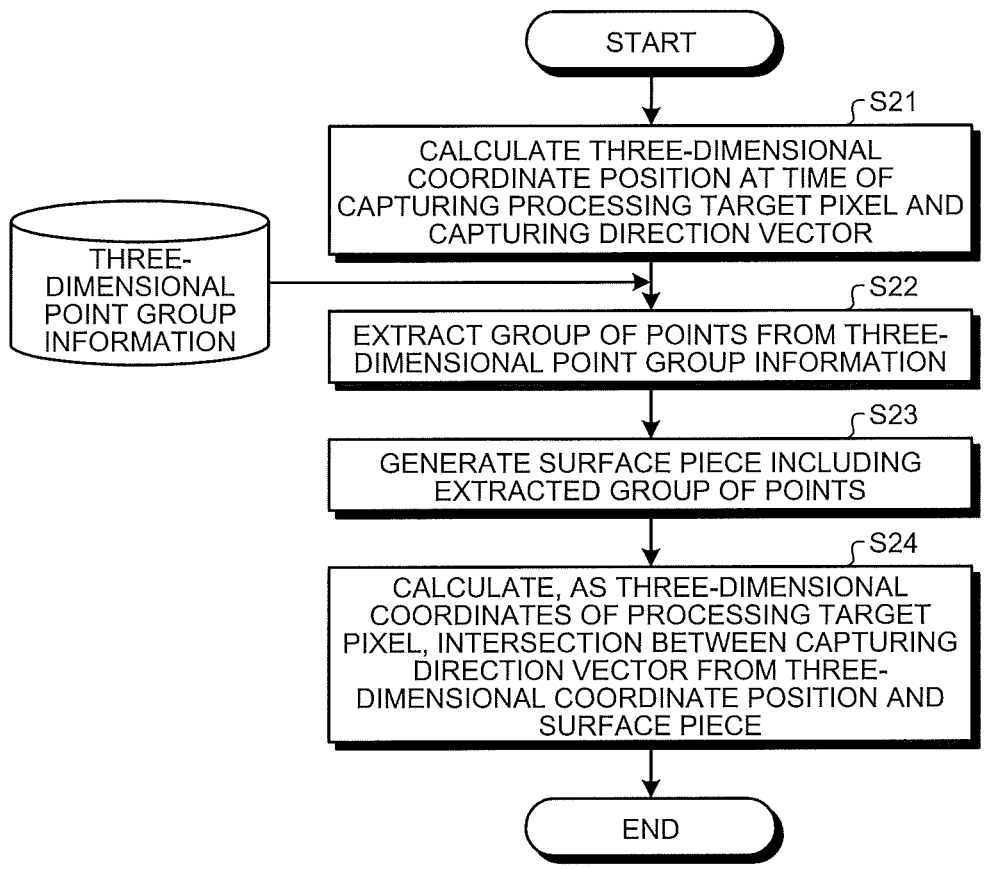
FIG. 6 is a flowchart illustrating a process of a crack vector information generation unit to calculate the three-dimensional coordinates of a pixel with an ON crack flag according to the first embodiment.

FIG. 6 is a flowchart illustrating a process of the crack vector information generation unit 32 to calculate the three-dimensional coordinates of a pixel with an ON crack flag according to the first embodiment. First, from three-dimensional positional coordinates indicating the optical center position of the camera at the time of capturing the image information, information on the camera pose in three axial directions, and the position of the processing target pixel on the image, the crack vector information generation unit 32 calculates a three-dimensional coordinate position at the time of capturing the processing target pixel and a capturing direction vector indicating the direction of capturing the image information from the three-dimensional coordinate position at the time of capturing (step S21).

From the three-dimensional point group information input from the three-dimensional point group information input unit 2, the crack vector information generation unit 32 extracts a group of points located in the direction advanced by the capturing direction vector calculated in step S21 from the three-dimensional coordinate position at the time of capturing the processing target pixel calculated in step S21 (step S22).

The crack vector information generation unit 32 generates a surface piece that includes the extracted group of points and a group of points around the extracted group of points using a technique such as plane approximation that utilizes the method of least squares (step S23).

Figure 7:
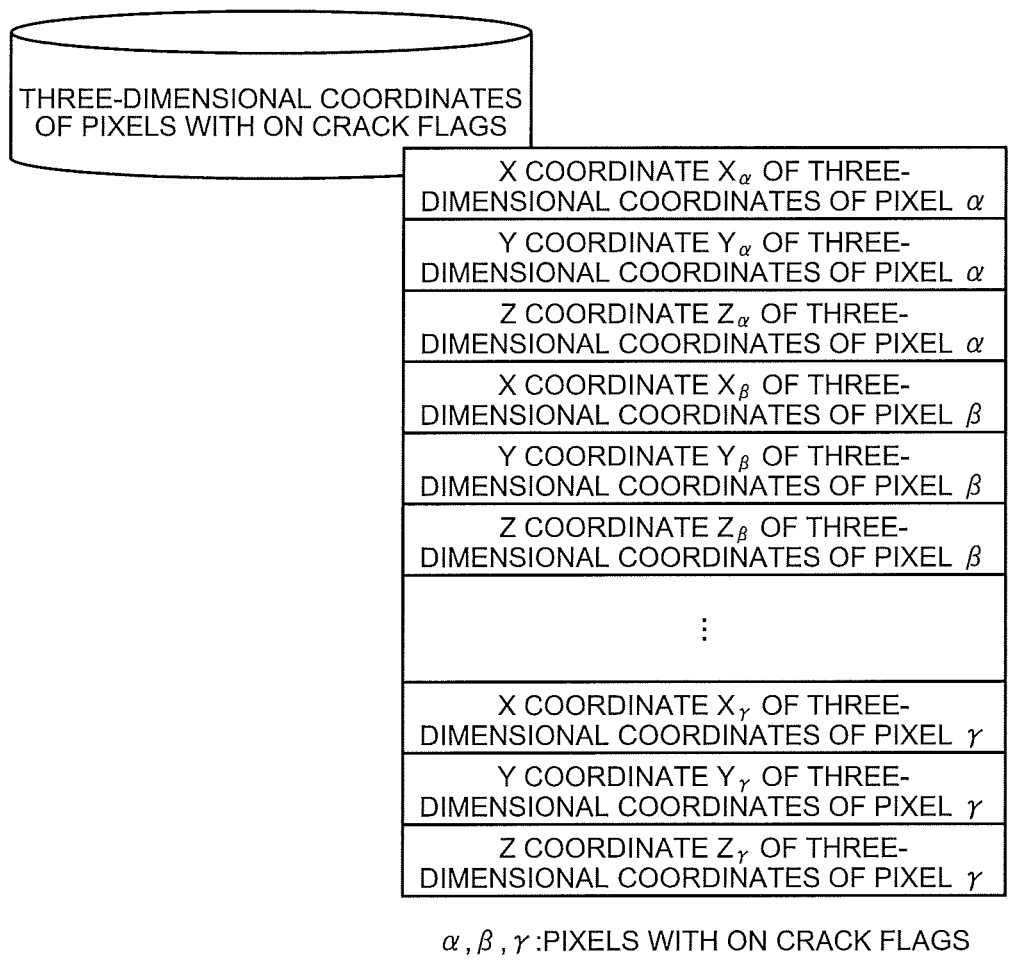
FIG. 7 is a diagram illustrating the content of information on the three-dimensional coordinates of pixels with ON crack flags calculated by the crack vector information generation unit according to the first embodiment.

The crack vector information generation unit 32 calculates and stores, as the three-dimensional coordinates of the processing target pixel, the intersection between the capturing direction vector from the three-dimensional coordinate position calculated for the processing target pixel and the generated surface piece (step S24). FIG. 7 is a diagram illustrating the content of information on the three-dimensional coordinates of pixels with ON crack flags calculated by the crack vector information generation unit 32 according to the first embodiment. The crack vector information generation unit 32 calculates three-dimensional coordinates for each pixel with an ON crack flag, and stores the three-dimensional coordinates of each pixel using the X, Y, and Z coordinates. The three-dimensional coordinates of pixels with ON crack flags illustrated in FIG. 7 may be stored in a storage unit inside the crack vector information generation unit 32, or may be stored in an external storage unit (not illustrated).

With reference back to the description of the flowchart of FIG. 2, the crack vector information generation unit 32 checks whether all the pixels of the image information have been processed, that is, whether three-dimensional coordinates have been calculated for all the pixels with ON crack flags (step S7). When not all the pixels have been processed (step S7: No), the crack vector information generation unit 32 returns to step S4 to select the next processing target pixel from the image information illustrated in FIG. 3 (step S4).

Figure 8:
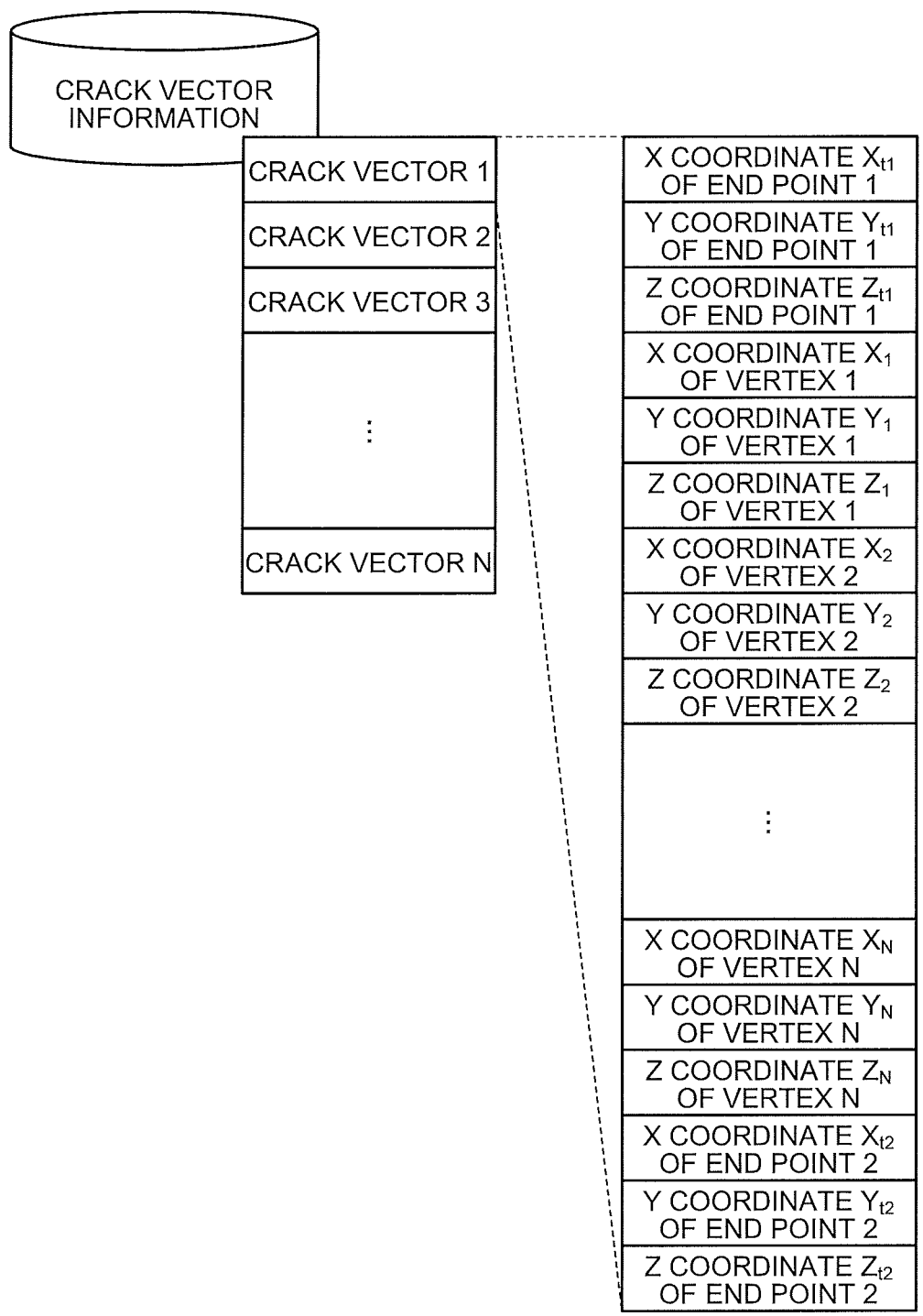
FIG. 8 is a diagram illustrating the content of crack vector information generated by the crack vector information generation unit according to the first embodiment.

When all the pixels have been processed (step S7: Yes), the crack vector information generation unit 32 generates individual crack vectors through processing such as linear approximation or line segment connection by grouping information on the three-dimensional coordinates of the pixels with ON crack flags or by utilizing the method of least squares (step S8). FIG. 8 is a diagram illustrating the content of crack vector information generated by the crack vector information generation unit 32 according to the first embodiment. It is assumed that each crack vector generated by the crack vector information generation unit 32 has a polygonal line shape. Since each crack vector has a polygonal line shape, the shape of a crack vector can be represented by two end points at opposite ends and a plurality of vertices. Therefore, for one crack vector, the position of each of the end points and vertices is stored using the X, Y, and Z coordinates. The crack vector information illustrated in FIG. 8 may be stored in a storage unit inside the crack vector information generation unit 32, or may be stored in an external storage unit (not illustrated).

Figure 9:
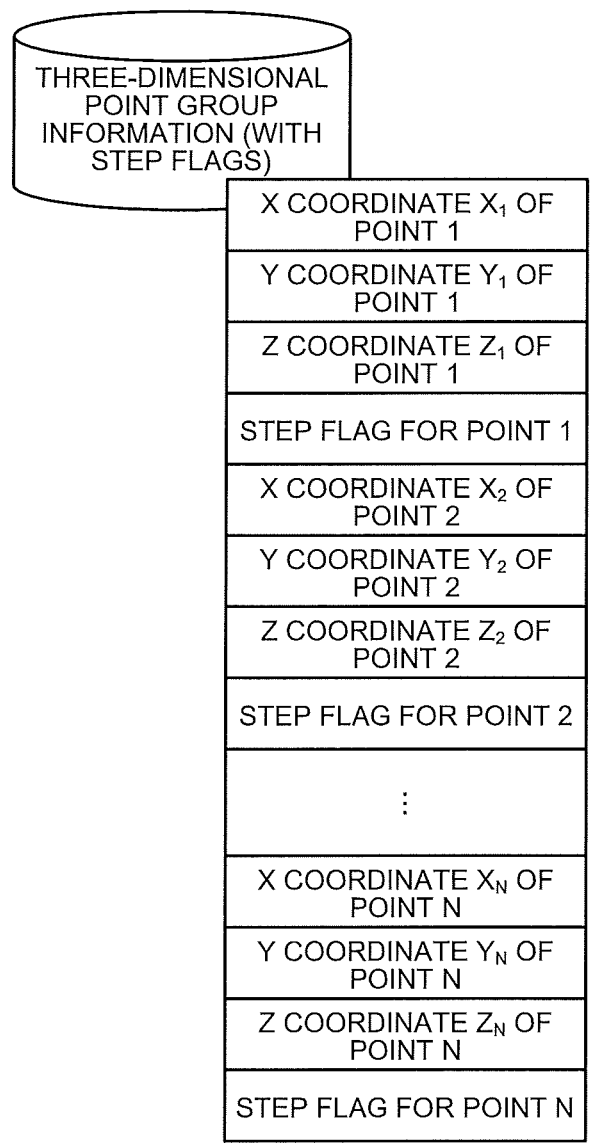
FIG. 9 is a diagram illustrating the content of three-dimensional point group information with step flag information about a step part extracted by a step extraction unit according to the first embodiment.

The step extraction unit 41 of the step detection unit 4 analyzes the three-dimensional point group information input from the three-dimensional point group information input unit 2, and extracts a step from the three-dimensional point group information (step S9). The step extraction unit 41 stores a group of points of the step portion in association with step flags with ON information indicating a step part. FIG. 9 is a diagram illustrating the content of three-dimensional point group information with step flag information about a step part extracted by the step extraction unit 41 according to the first embodiment. The three-dimensional point group information with the step flag information illustrated in FIG. 9 is obtained by adding step flag information to the three-dimensional point group information on each point illustrated in FIG. 4. The three-dimensional point group information with the step flag information illustrated in FIG. 9 may be stored in a storage unit inside the step extraction unit 41, or may be stored in an external storage unit (not illustrated). When step flag information is added to each point of the three-dimensional point group information, the three-dimensional point group information and the step flag information may be separately stored as in the case of the image information illustrated in FIG. 3 and the crack flag information illustrated in FIG. 5 as described in relation to the image information, instead of being stored together as described with reference to FIG. 9.

Figure 10:
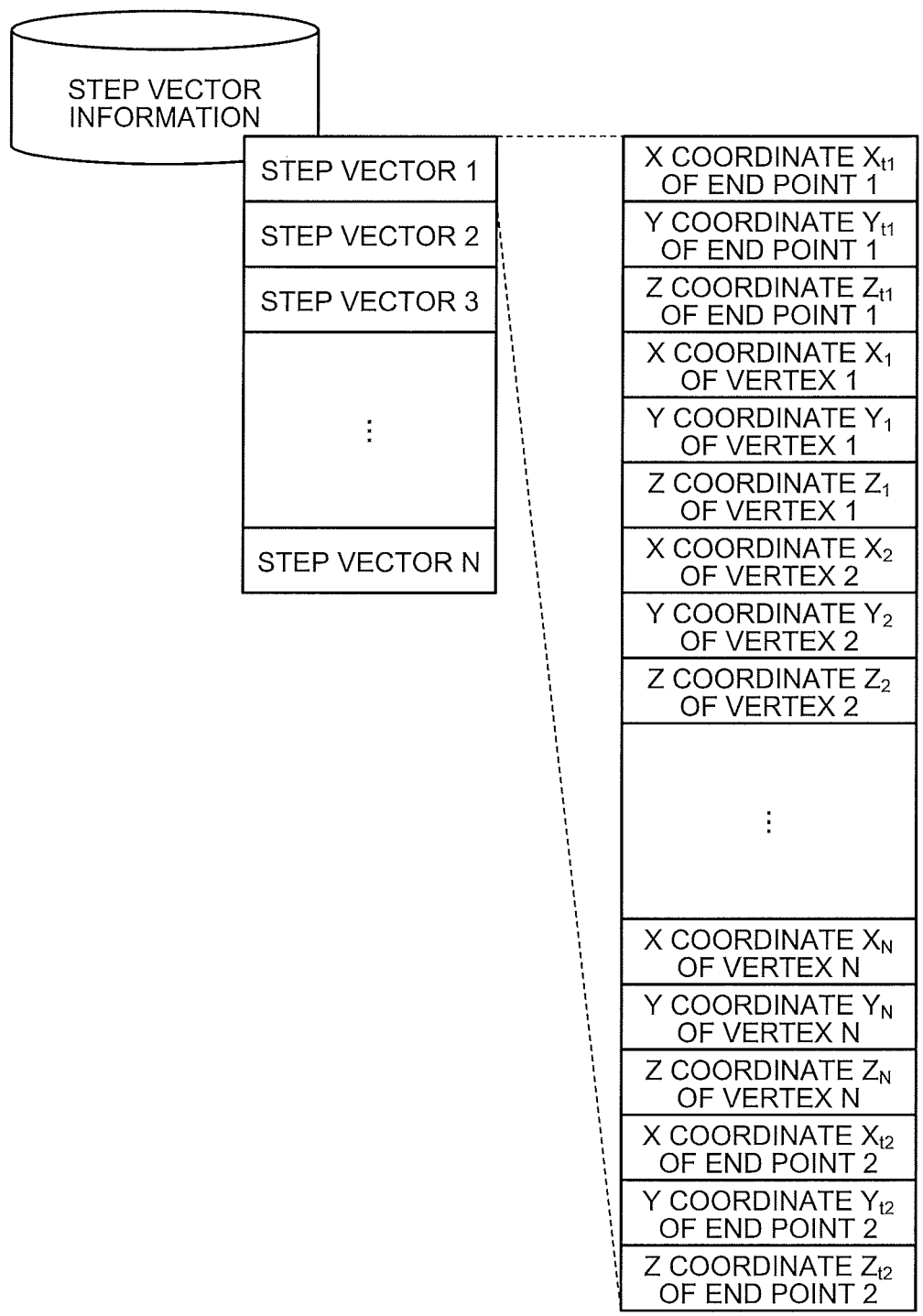
FIG. 10 is a diagram illustrating the content of step vector information generated by a step vector information generation unit according to the first embodiment.

The step vector information generation unit 42 generates individual step vectors through processing such as linear approximation or line segment connection by grouping the three-dimensional point group information with ON step flags or by utilizing the method of least squares (step S10). FIG. 10 is a diagram illustrating the content of step vector information generated by the step vector information generation unit 42 according to the first embodiment. It is assumed that each step vector generated by the step vector information generation unit 42 has a polygonal line shape. Since each step vector has a polygonal line shape, the shape of a step vector can be represented by two end points at opposite ends and a plurality of vertices. Therefore, for one step vector, the position of each of the end points and vertices is stored using the X, Y, and Z coordinates. The step vector information illustrated in FIG. 10 may be stored in a storage unit inside the step vector information generation unit 42, or may be stored in an external storage unit (not illustrated).

The determination unit 5 performs vector comparison using the crack vector generated by the crack vector information generation unit 32 and the step vector generated by the step vector information generation unit 42 (step S11). Specifically, the determination unit 5 calculates the distance between each line segment of the crack vector and a line segment of the step vector nearest to the each line segment of the crack vector, and determines whether the crack is accompanied by lifting separation on the basis of the ratio of points of a single crack vector having a distance to the corresponding step vector less than a specified threshold value (step S12).

FIGS. 11 to 14 are diagrams illustrating exemplary images for comparing a crack vector and a step vector in the determination unit 5 according to the first embodiment. Here, as an example, it is assumed that the threshold value of the inter-segment distance is a threshold value $\gamma$, and the determination unit 5 determines that a crack is accompanied by lifting separation when the ratio of points having an inter-segment distance equal to or less than the threshold value $\gamma$ to all the points is 50% or more. It is also assumed that the determination unit 5 can accept an operation from a user to set or change the value of 50%.

Figure 11:
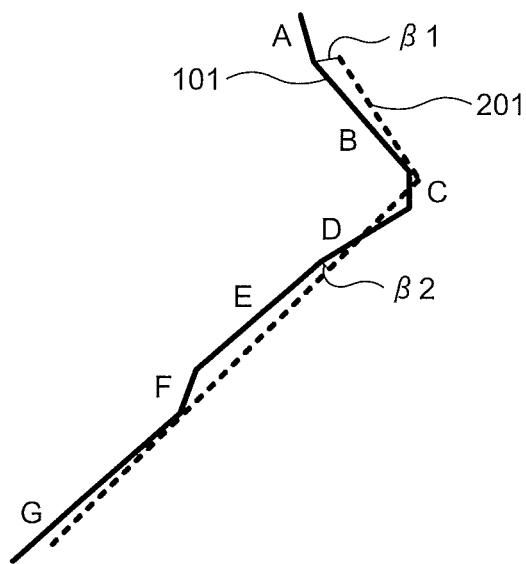
FIG. 11 is a diagram illustrating a first exemplary image for comparing a crack vector and a step vector in the determination unit according to the first embodiment.

When comparing a crack vector 101 and a step vector 201 illustrated in FIG. 11, the determination unit 5 determines that the distance between a line segment section A of the crack vector 101 and the step vector 201 is $\beta 1$, the distance between a line segment section B of the crack vector 101 and the step vector 201 is zero, the distance between a line segment section C of the crack vector 101 and the step vector 201 is zero, the distance between a line segment section D of the crack vector 101 and the step vector 201 is zero, the distance between a line segment section E of the crack vector 101 and the step vector 201 is $\beta 2$, the distance between a line segment section F of the crack vector 101 and the step vector 201 is zero, and the distance between a line segment section G of the crack vector 101 and the step vector 201 is zero. Since $\beta 1$ and 32 are both less than the threshold value $\gamma$, the number of points having an inter-segment distance equal to or less than the threshold value $\gamma$ is seven, and thus the ratio of points having an inter-segment distance equal to or less than the threshold value $\gamma$ is 100% (7/7=100%). Therefore, the determination unit 5 determines that the crack vector 101 is a crack accompanied by lifting separation.

Figure 12:
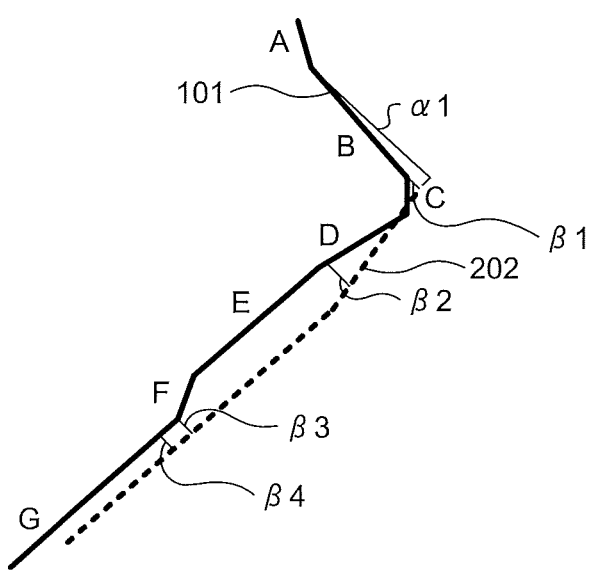
FIG. 12 is a diagram illustrating a second exemplary image for comparing the crack vector and a step vector in the determination unit according to the first embodiment.

When comparing the crack vector 101 and a step vector 202 illustrated in FIG. 12, the determination unit 5 determines that the distance between the line segment section A of the crack vector 101 and the step vector 202 is $\alpha 1$, the distance between the line segment section B of the crack vector 101 and the step vector 202 is $\beta 1$, the distance between the line segment section C of the crack vector 101 and the step vector 202 is zero, the distance between the line segment section D of the crack vector 101 and the step vector 202 is zero, the distance between the line segment section E of the crack vector 101 and the step vector 202 is $\beta 2$, the distance between the line segment section F of the crack vector 101 and the step vector 202 is $\beta 3$, and the distance between the line segment section G of the crack vector 101 and the step vector 202 is $\beta 4$. Since $\alpha 1$ is equal to or greater than the threshold value $\gamma$, and $\beta 1$ to $\beta 4$ are less than the threshold value $\gamma$, the number of points having an inter-segment distance equal to or less than the threshold value $\gamma$ is six, and the ratio of points having an inter-segment distance equal to or less than the threshold value $\gamma$ is 85.7% (6/7=85.7%). Therefore, the determination unit 5 determines that the crack vector 101 is a crack accompanied by lifting separation.

Figure 13:
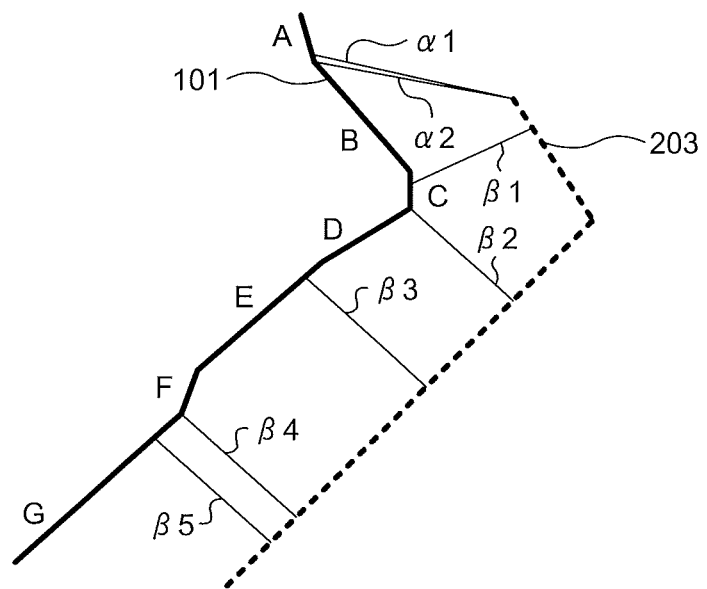
FIG. 13 is a diagram illustrating a third exemplary image for comparing the crack vector and a step vector in the determination unit according to the first embodiment.

When comparing the crack vector 101 and a step vector 203 illustrated in FIG. 13, the determination unit 5 determines that the distance between the line segment section A of the crack vector 101 and the step vector 203 is $\alpha 1$, the distance between the line segment section B of the crack vector 101 and the step vector 203 is $\alpha 2$, the distance between the line segment section C of the crack vector 101 and the step vector 203 is $\beta 1$, the distance between the line segment section D of the crack vector 101 and the step vector 203 is $\beta 2$, the distance between the line segment section E of the crack vector 101 and the step vector 203 is $\beta 3$, the distance between the line segment section F of the crack vector 101 and the step vector 203 is $\beta 4$, and the distance between the line segment section G of the crack vector 101 and the step vector 203 is $\beta 5$. Since $\alpha 1$ and $\alpha 2$ are both equal to or greater than the threshold value $\gamma$, and $\beta 1$ to $\beta 5$ are less than the threshold value $\gamma$, the number of points having an inter-segment distance equal to or less than the threshold value $\gamma$ is five, and the ratio of points having an inter-segment distance equal to or less than the threshold value $\gamma$ is 71.4% (5/7=71.4%). Therefore, the determination unit 5 determines that the crack vector 101 is a crack accompanied by lifting separation.

Figure 14:
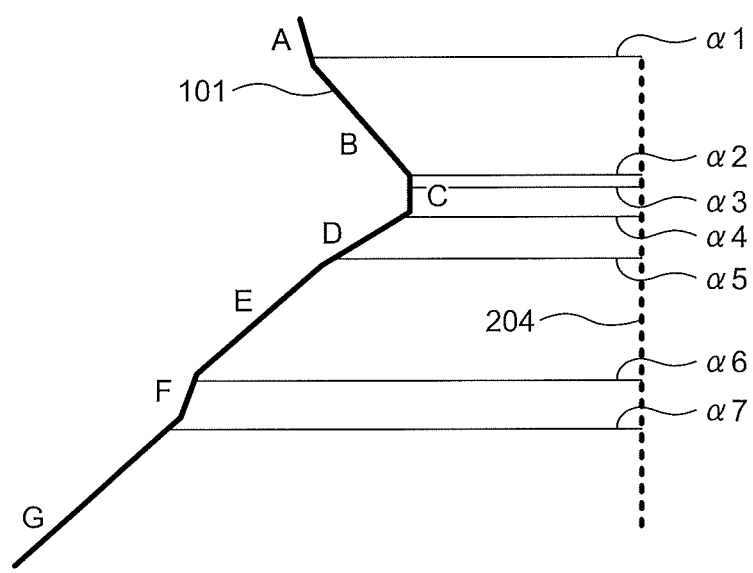
FIG. 14 is a diagram illustrating a fourth exemplary image for comparing the crack vector and a step vector in the determination unit according to the first embodiment.

When comparing the crack vector 101 and a step vector 204 illustrated in FIG. 14, the determination unit 5 determines that the distance between the line segment section A of the crack vector 101 and the step vector 204 is $\alpha 1$, the distance between the line segment section B of the crack vector 101 and the step vector 204 is $\alpha 2$, the distance between the line segment section C of the crack vector 101 and the step vector 204 is $\alpha 3$, the distance between the line segment section D of the crack vector 101 and the step vector 204 is $\alpha 4$, the distance between the line segment section E of the crack vector 101 and the step vector 204 is $\alpha 5$, the distance between the line segment section F of the crack vector 101 and the step vector 204 is $\alpha 6$, and the distance between the line segment section G of the crack vector 101 and the step vector 204 is $\alpha 7$. Since $\alpha 1$ to $\alpha 7$ are equal to or greater than the threshold value $\gamma$, the number of points having an inter-segment distance equal to or less than the threshold value $\gamma$ is zero, and the ratio of points having an inter-segment distance equal to or less than the threshold value $\gamma$ is 0% (0/7=0%). Therefore, the determination unit 5 determines that the crack vector 101 is not a crack accompanied by lifting separation.

Figure 15:
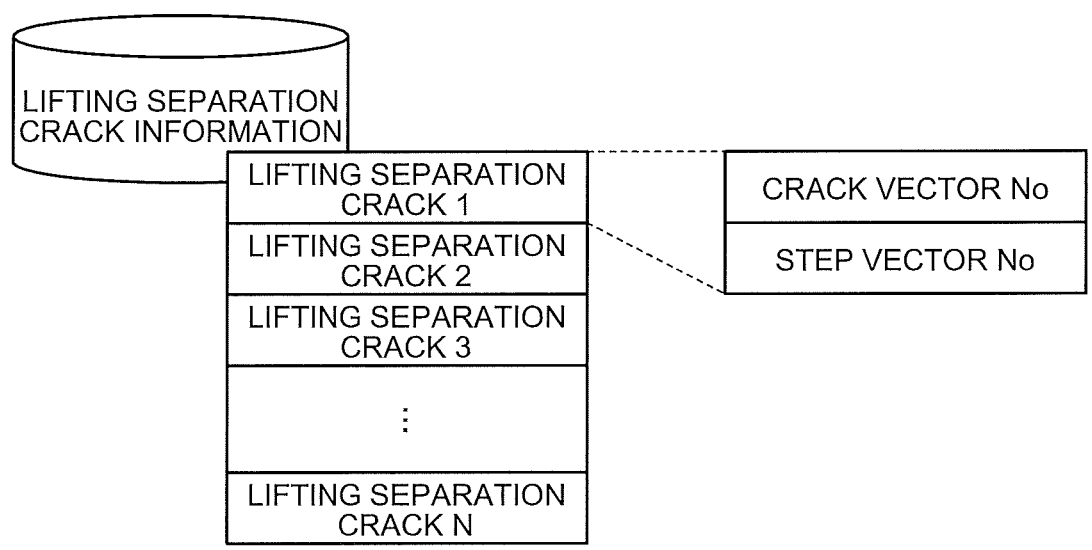
FIG. 15 is a diagram illustrating the content of lifting separation crack information about cracks determined to be accompanied by lifting separation in the determination unit according to the first embodiment.

The determination unit 5 can calculate the distance between line segments of crack and step vectors using either the two-dimensional coordinates or the three-dimensional coordinates. The determination unit 5 stores, as lifting separation crack information, cracks identified as being accompanied by lifting separation in association with information on the corresponding crack and step vectors. FIG. 15 is a diagram illustrating the content of lifting separation crack information about cracks determined to be accompanied by lifting separation in the determination unit 5 according to the first embodiment. The determination unit 5 stores each lifting separation crack determined to be a crack accompanied by lifting separation in association with information on crack and step vectors. The lifting separation crack information illustrated in FIG. 15 may be stored in a storage unit inside the determination unit 5, or may be stored in an external storage unit (not illustrated).

The determination unit 5 compares a crack vector and a step vector, and when the ratio of points having an inter-segment distance equal to or less than the threshold value $\gamma$ is 50% or more as illustrated in FIGS. 11 to 13, the determination unit 5 determines that the crack vector 101 is a crack accompanied by lifting separation, and stores lifting separation crack information therefor. When the ratio of points having an inter-segment distance equal to or less than the threshold value $\gamma$ is less than 50% as illustrated in FIG. 14, the determination unit 5 determines that the crack vector 101 is not a crack accompanied by lifting separation, and does not store lifting separation crack information therefor. Although the determination unit 5 determines whether a crack is accompanied by lifting separation on the basis of the ratio of points having an inter-segment distance equal to or less than the threshold value $\gamma$, the determination unit 5 may determine whether a crack is accompanied by lifting separation on the basis of the number of points having an inter-segment distance equal to or less than the threshold value $\gamma$.

When vector comparison has not been completed for at least one of the crack vectors (step S13: No), the determination unit 5 returns to step S11 to select the next crack vector and perform vector comparison. When vector comparison has been completed for all the crack vectors (step S13: Yes), the determination unit 5 ends the process.

Subsequently, the hardware configuration of the detection device 20 will be described. In the detection device 20, the image information input unit 1 is implemented by a measuring device such as a digital camera or an interface circuit that acquires data on image information. The three-dimensional point group information input unit 2 is implemented by a measuring device such as a high-density laser scanner or an interface circuit that acquires data on three-dimensional point group information. The crack detection unit 3, which includes the crack extraction unit 31 and the crack vector information generation unit 32, the step detection unit 4, which includes the step extraction unit 41 and the step vector information generation unit 42, and the determination unit 5 are implemented by a processing circuitry. That is, the detection device 20 includes a processing circuitry for generating a crack vector from image information, generating a step vector from three-dimensional point group information, and comparing the crack vector and the step vector to determine whether the crack represented by the crack vector is accompanied by lifting separation. The processing circuitry may be dedicated hardware or a central processing unit (CPU) that executes programs stored in a memory and the memory.

Figure 16:
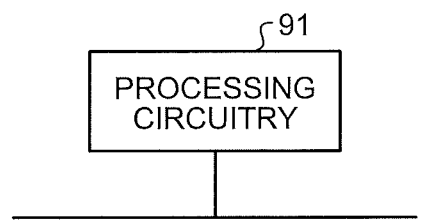
FIG. 16 is a diagram illustrating an exemplary case where the detection device according to the first embodiment is configured with dedicated hardware.

FIG. 16 is a diagram illustrating an exemplary case where the detection device 20 according to the first embodiment is configured with dedicated hardware. In a case where the processing circuitry is dedicated hardware, a processing circuitry 91 illustrated in FIG. 16 corresponds, for example, to a single circuit, a composite circuit, a programmed processor, a parallel programmed processor, an application specific integrated circuit (ASIC), a field programmable gate array (FPGA), or a combination thereof. Each of the functions of the detection device 20 may be individually implemented by the processing circuitry 91 or the functions of the detection device 20 may together be implemented by the processing circuitry 91.

Figure 17:
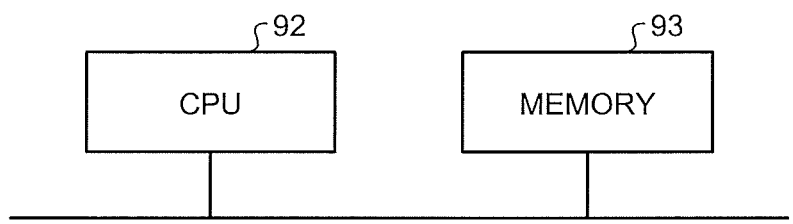
FIG. 17 is a diagram illustrating an exemplary case where the detection device according to the first embodiment is configured with a CPU and a memory.

FIG. 17 is a diagram illustrating an exemplary case where the detection device 20 according to the first embodiment is configured with a CPU and a memory. In a case where a processing circuitry includes a CPU 92 and a memory 93, the functions of the detection device 20 are implemented by software, firmware, or a combination of software and firmware. Software or firmware is described in the form of a program and stored in the memory 93. In the processing circuitry, the CPU 92 reads and executes the program stored in the memory 93, thereby implementing each function. That is, the detection device 20 includes the memory 93 to store a program which, when executed by the processing circuitry, performs a step of generating a crack vector from image information, a step of generating a step vector from three-dimensional point group information, and a step of comparing the crack vector and the step vector to determine whether the crack represented by the crack vector is accompanied by lifting separation. In other words, these programs cause a computer to execute the procedures and methods for the detection device 20. The CPU 92 may be a processing device, a computing device, a microprocessor, a microcomputer, a processor, a digital signal processor (DSP), or the like. Examples of the memory 93 include a non-volatile or volatile semiconductor memory, a magnetic disk, a flexible disk, an optical disc, a compact disc, a mini disc, a digital versatile disc (DVD), and the like. Examples of non-volatile or volatile semiconductor memories include a random access memory (RAM), a read only memory (ROM), a flash memory, an erasable programmable ROM (EPROM), an electrically EPROM (EEPROM), and the like.

Note that the functions of the detection device 20 may be implemented partly by dedicated hardware and partly by software or firmware. For example, the function of generating a crack vector from image information and the function of generating a step vector from three-dimensional point group information can be implemented by the processing circuitry 91 serving as dedicated hardware, and the function of comparing the crack vector and the step vector to determine whether the crack represented by the crack vector is accompanied by lifting separation can be implemented by the CPU 92 reading and executing programs stored in the memory 93.

In this manner, the processing circuitry can implement the above-described functions using dedicated hardware, software, firmware, or a combination thereof.

As described above, according to the present embodiment, the detection device 20 generates a step vector from three-dimensional point group information obtained through laser measurement, generates a crack vector from image information obtained through capturing simultaneously with the laser measurement, and compares the crack vector and the step vector to determine the state of the crack represented by the crack vector on the basis of the distance between line segments constituting the respective vectors. As a result, the detection device 20 can eliminate the need for a large amount of work time by human power, and can automatically determine whether a crack generated on the surface of a structure is merely a crack or a crack accompanied by lifting separation without depending on the experience and skill of the investigator. The detection device 20 can thus have an improved accuracy of detecting a cracked state.

Second Embodiment

In the first embodiment, the detection device 20 generates a crack vector from image information, generates a step vector from three-dimensional point group information, and compares the two vectors to determine whether the crack is accompanied by lifting separation. In a second embodiment, a description will be given of a case where the state of a crack is determined in a detection device without vectorizing a crack obtained from image information.

Figure 18:
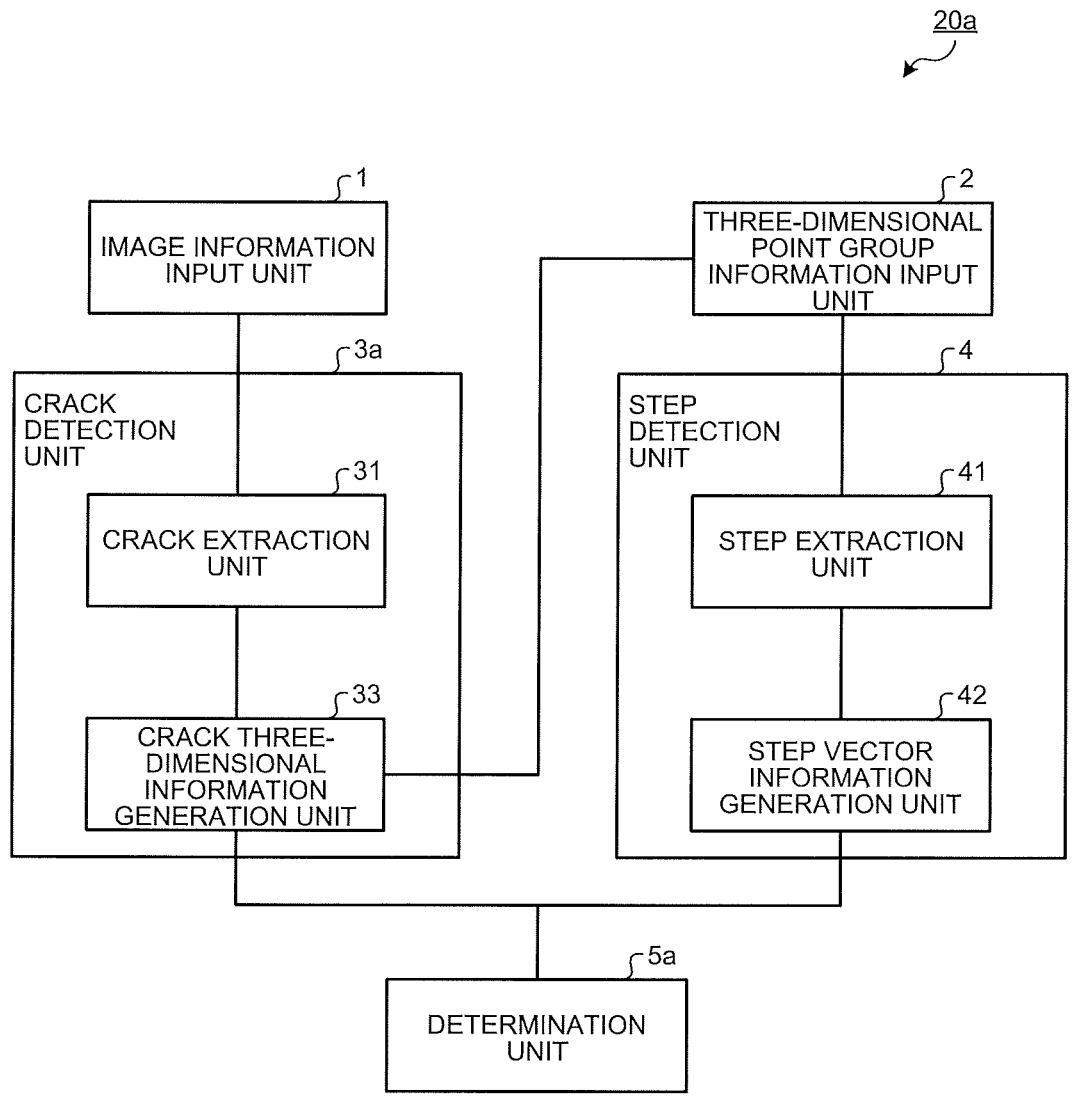
FIG. 18 is a block diagram illustrating an exemplary configuration of a detection device according to a second embodiment.

FIG. 18 is a block diagram illustrating an exemplary configuration of a detection device 20a according to the second embodiment. The detection device 20a is configured by replacing the crack detection unit 3 and the determination unit 5 of the detection device 20 with a crack detection unit 3a and a determination unit 5a. The crack detection unit 3a is configured by replacing the crack vector information generation unit 32 of the crack detection unit 3 with a crack three-dimensional information generation unit 33.

In a similar manner to the crack vector information generation unit 32, the crack three-dimensional information generation unit 33, which is a deformation three-dimensional information generation unit, calculates, for each pixel of the crack image information generated by the crack extraction unit 31, three-dimensional absolute coordinates on the structure surface on the basis of the information on the three-dimensional positional coordinates indicating the optical center position of the camera at the time of capturing the image information, information on the camera pose in three axial directions, and three-dimensional point group information input from the three-dimensional point group information input unit 2, thereby obtaining three-dimensional information about the crack image information. However, the crack three-dimensional information generation unit 33 obtains three-dimensional information about crack image information with respect to the pixels in a range defined by adding a certain margin range to the crack image information extracted by the crack extraction unit 31. In the second embodiment, pixels in a range defined by adding a certain margin range to each pixel corresponding to a crack are regarded as being in a deformation range. The crack three-dimensional information generation unit 33 does not generate crack vector information unlike the crack vector information generation unit 32, but finishes its processing after obtaining three-dimensional information for the pixels corresponding to a crack portion and pixels in a margin range.

Figure 19:
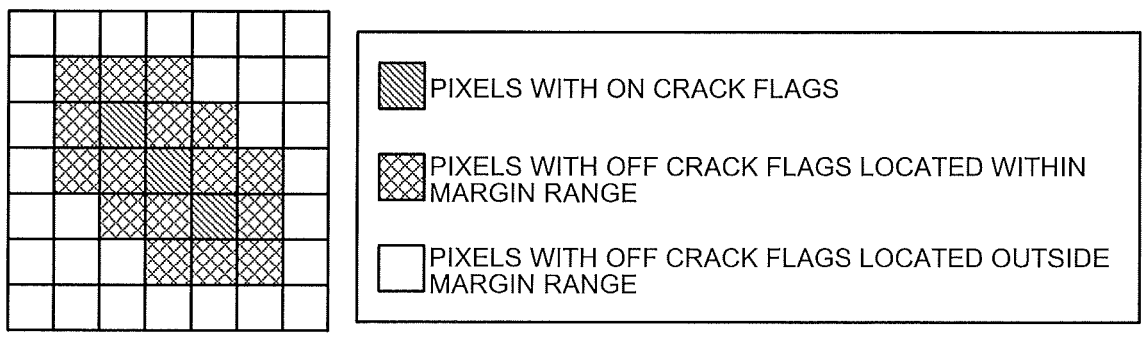
FIG. 19 is a diagram illustrating an exemplary range of pixels for which a three-dimensional image is to be obtained by a crack three-dimensional information generation unit according to the second embodiment, assuming that the margin range is one pixel.

A method of adding a certain margin range to crack image information will be described. FIG. 19 is a diagram illustrating an exemplary range of pixels for which a three-dimensional image is to be obtained by the crack three-dimensional information generation unit 33 according to the second embodiment, assuming that the margin range is one pixel. In this example, one pixel adjacent to each of the pixels with ON crack flags is regarded as being in a certain margin range. The crack three-dimensional information generation unit 33 obtains three-dimensional information about the pixels with ON crack flags and the pixels with OFF crack flags located within the margin range. The crack three-dimensional information generation unit 33 does not obtain three-dimensional information with respect to the pixels with OFF crack flags located outside the margin range.

Figure 20:
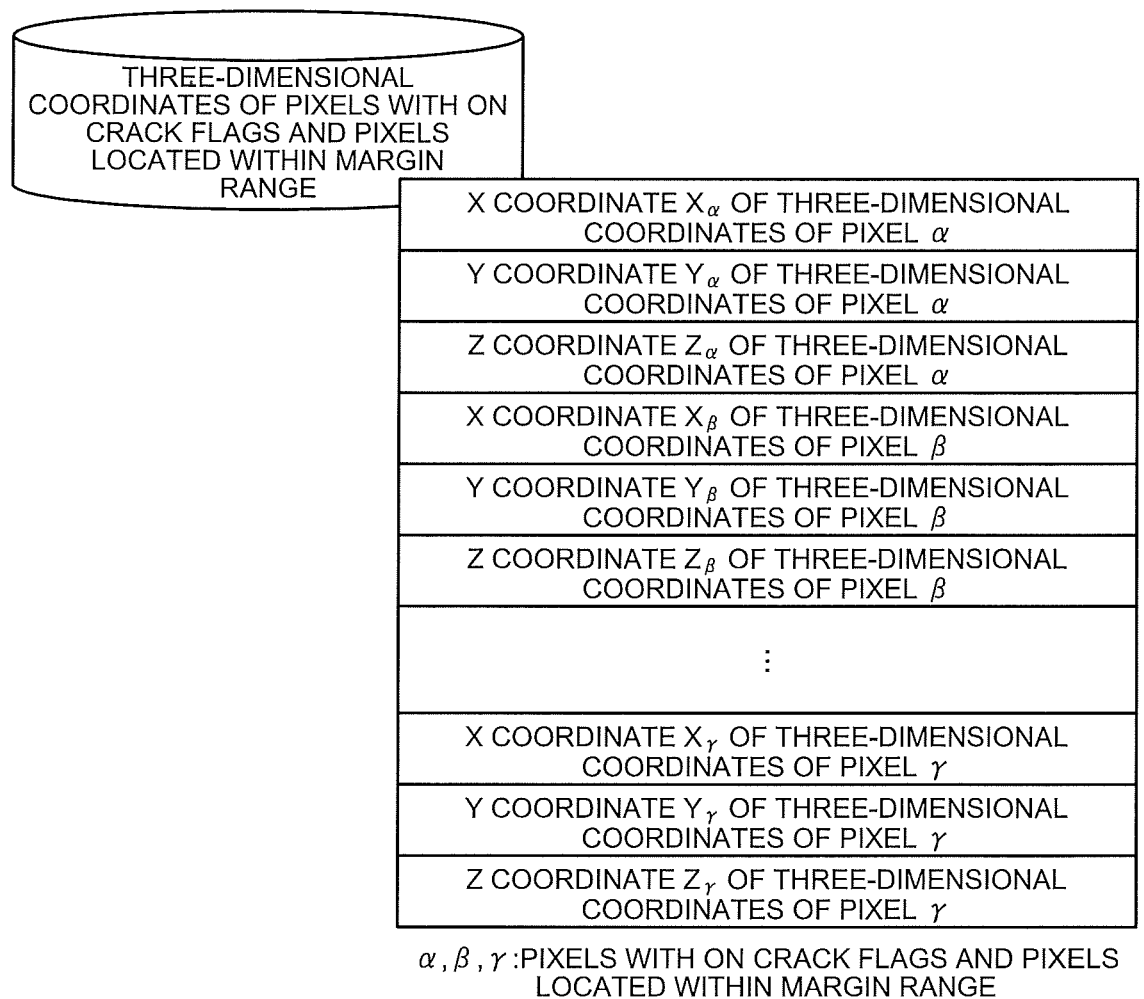
FIG. 20 is a diagram illustrating the content of information on the three-dimensional coordinates of pixels with ON crack flags and pixels within a margin range calculated by the crack three-dimensional information generation unit according to the second embodiment.

FIG. 20 is a diagram illustrating the content of information on the three-dimensional coordinates of pixels with ON crack flags and pixels within a margin range calculated by the crack three-dimensional information generation unit 33 according to the second embodiment. The crack three-dimensional information generation unit 33 calculates three-dimensional coordinates for each of the pixels with ON crack flags and pixels located within the margin range, and stores, as three-dimensional information on the deformation, the three-dimensional coordinates of each pixel using the X, Y, and Z coordinates. The three-dimensional coordinates of the pixels with ON crack flags and pixels located within the margin range illustrated in FIG. 20 may be stored in a storage unit inside the crack three-dimensional information generation unit 33, or may be stored in an external storage unit (not illustrated).

The determination unit 5a determines the state of a deformation by using the three-dimensional information on the deformation that is information on the deformation and using the vector information on a step. Specifically, from information on the three-dimensional coordinates of pixels with ON crack flags and pixels within a margin range generated by the crack three-dimensional information generation unit 33, the determination unit 5a generates a three-dimensional space that includes all the coordinates of the pixels with ON crack flags and pixels located within the margin range. The determination unit 5a calculates the existence ratio that is the ratio of a three-dimensional step vector generated by the step vector information generation unit 42 existing in the three-dimensional space. When the existence ratio of the step vector in the three-dimensional space is equal to or greater than a threshold value, the determination unit 5a determines that the crack represented by the pixels with ON crack flags is accompanied by lifting separation, and stores the result.

Instead of performing determination by calculating the existence ratio of a three-dimensional step vector in a three-dimensional space that includes all the coordinates of pixels with ON crack flags and pixels in a margin range, the determination unit 5a may project both the three-dimensional space and the three-dimensional step vector onto a two-dimensional plane to perform determination using the positional relation on the two-dimensional plane between the area range of a region that includes the two-dimensional pixels with ON crack flags and two-dimensional pixels in the margin range and the two-dimensional step vector.

Figure 21:
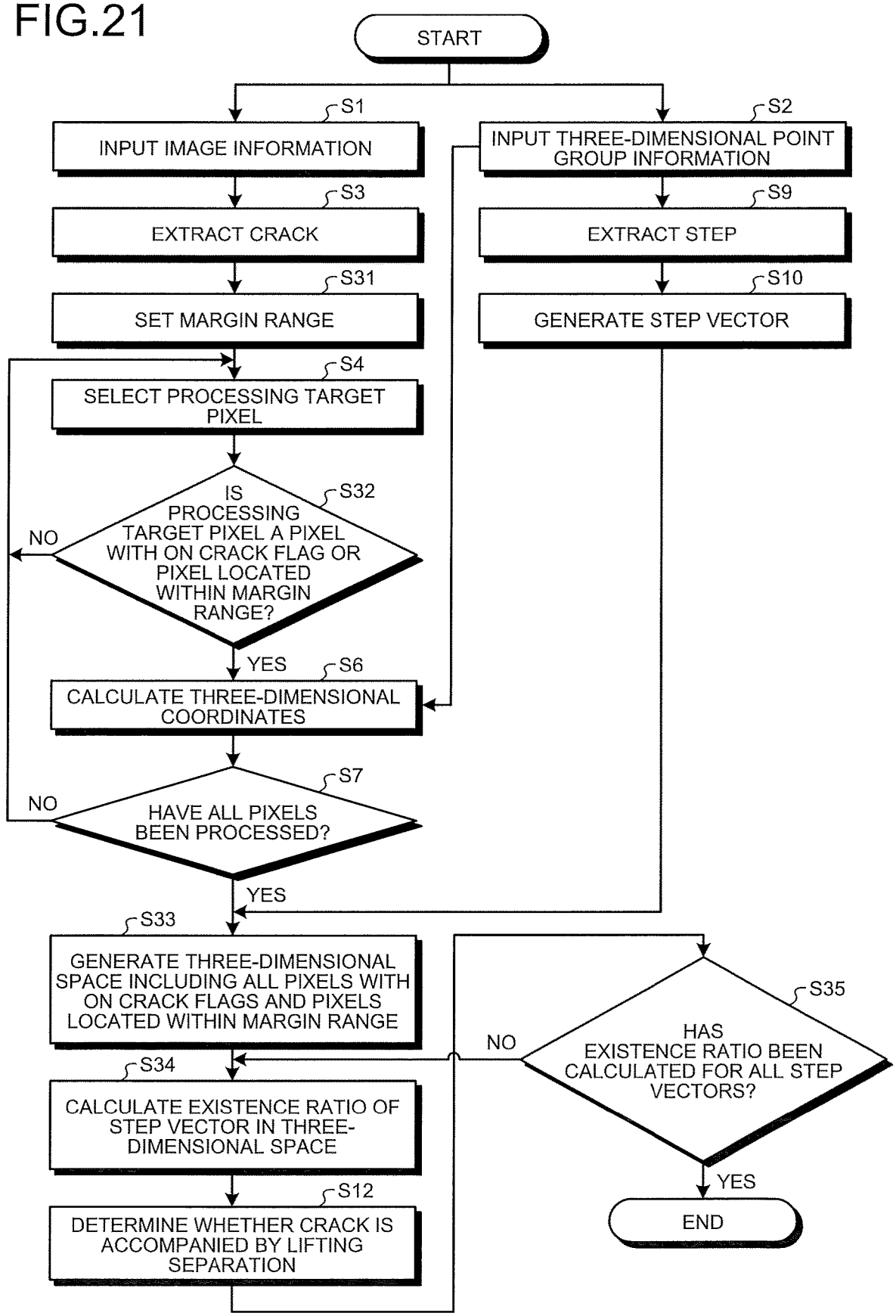
FIG. 21 is a flowchart illustrating a process of the detection device to determine the state of a detected crack according to the second embodiment.

Next, a description will be given of a process of the detection device 20a to determine whether a deformation detected on the surface of a structure is merely a crack or a crack accompanied by lifting separation. FIG. 21 is a flowchart illustrating a process of the detection device 20a to determine the state of a detected crack according to the second embodiment. The difference from the flowchart of the first embodiment illustrated in FIG. 2 will be described.

The crack three-dimensional information generation unit 33 sets a margin range for the pixels of a crack extracted by the crack extraction unit 31, that is, pixels with ON crack flags (step S31). The crack three-dimensional information generation unit 33 checks whether a processing target pixel selected in step S4 is a pixel with an ON crack flag or a pixel located within the margin range (step S32). When the processing target pixel is neither a pixel with an ON crack flag nor a pixel located within the margin range (step S32: No), the crack three-dimensional information generation unit 33 returns to step S4 to select the next processing target pixel from the image information illustrated in FIG. 3 (step S4). When the processing target pixel is either a pixel with an ON crack flag or a pixel located within the margin range (step S32: Yes), the crack three-dimensional information generation unit 33 calculates the three-dimensional coordinates of the pixel with the ON crack flag or the pixel located within the margin range on the basis of the three-dimensional point group information (step S6). The process of the crack three-dimensional information generation unit 33 to calculate the three-dimensional coordinates of a pixel with an ON crack flag or a pixel located within a margin range is the same as the process of the crack vector information generation unit 32 of the first embodiment to calculate the three-dimensional coordinates of a pixel with an ON crack flag. However, pixels targeted for three-dimensional coordinate calculation are different from those in the first embodiment.

From the information on the three-dimensional coordinates of the pixels with ON crack flags and pixels within the margin range generated by the crack three-dimensional information generation unit 33, the determination unit 5a generates a three-dimensional space that includes all the pixels with ON crack flags and pixels located within the margin range (step S33). Then, the determination unit 5a calculates the existence ratio of a three-dimensional step vector generated by the step vector information generation unit 42 in the three-dimensional space (step S34). On the basis of the calculated existence ratio, the determination unit 5a determines whether the crack is accompanied by lifting separation (step S12).

FIGS. 22 to 25 are diagrams illustrating exemplary images for calculating the existence ratio of a step vector in a three-dimensional space in the determination unit 5a according to the second embodiment. Here, as an example, it is assumed that the margin range is two pixels, and the determination unit 5a determines that a crack is accompanied by lifting separation when the existence ratio is 50% or more.

Figure 22:
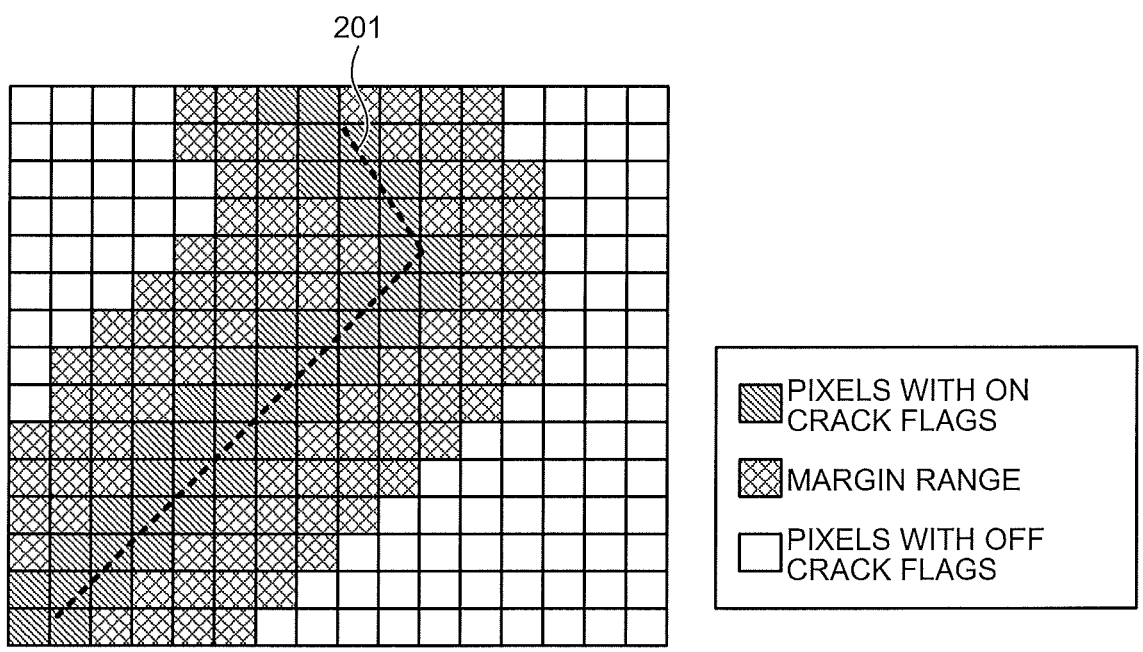
FIG. 22 is a diagram illustrating a first exemplary image for calculating the existence ratio of the step vector in a three-dimensional space in the determination unit according to the second embodiment.
Figure 23:
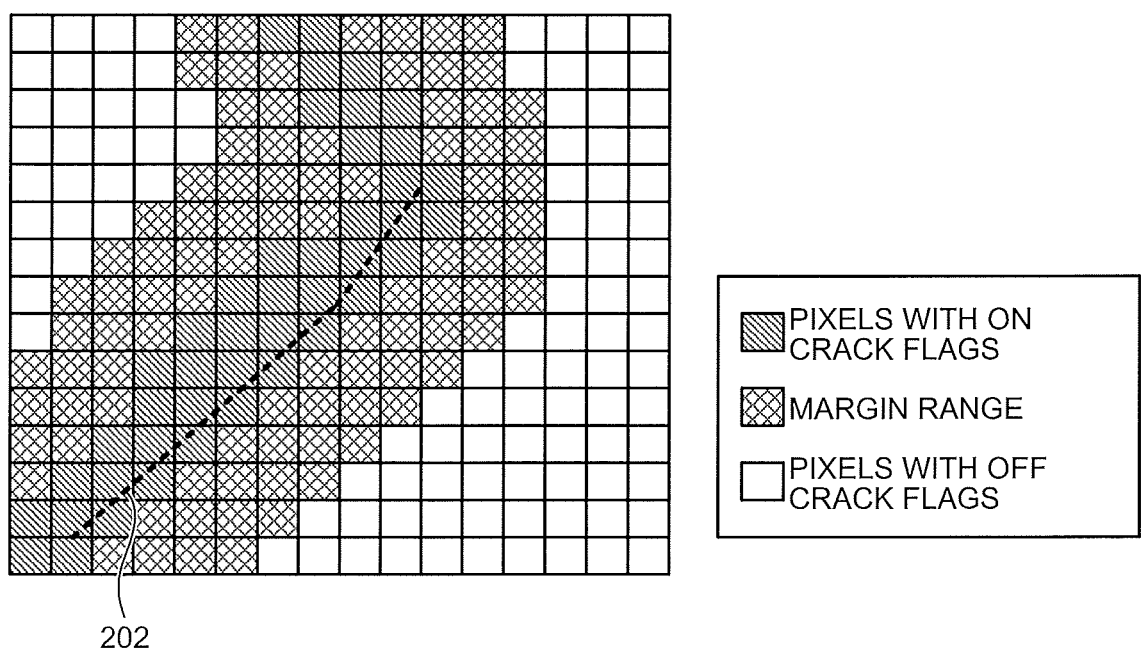
FIG. 23 is a diagram illustrating a second exemplary image for calculating the existence ratio of the step vector in a three-dimensional space in the determination unit according to the second embodiment.

The existence ratio of the step vector 201 in the three-dimensional space illustrated in FIG. 22 is 100%, and the determination unit 5a determines that the crack represented by the pixels with ON crack flags is accompanied by lifting separation. The existence ratio of the step vector 202 in the three-dimensional space illustrated in FIG. 23 is 100%, and the determination unit 5a determines that the crack represented by the pixels with ON crack flags is accompanied by lifting separation.

Figure 24:
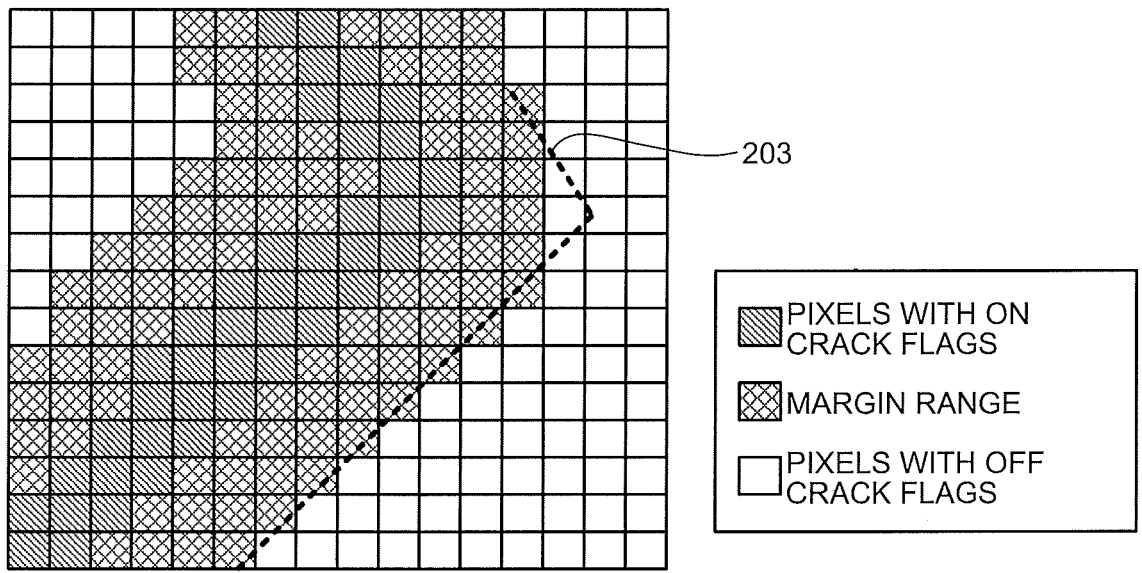
FIG. 24 is a diagram illustrating a third exemplary image for calculating the existence ratio of the step vector in a three-dimensional space in the determination unit according to the second embodiment.
Figure 25:
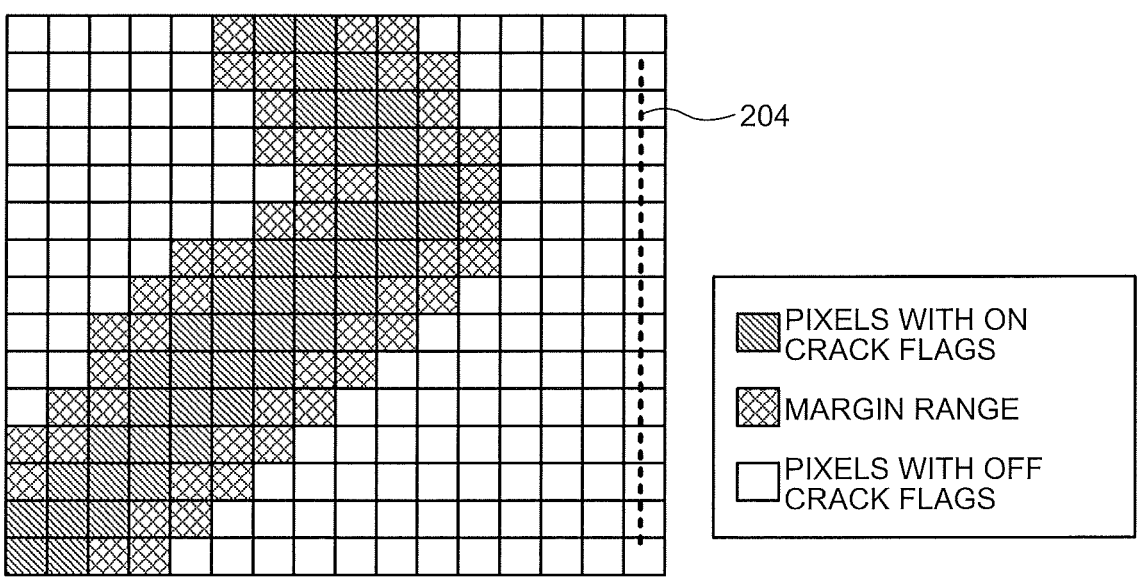
FIG. 25 is a diagram illustrating a fourth exemplary image for calculating the existence ratio of the step vector in a three-dimensional space in the determination unit according to the second embodiment.

The existence ratio of the step vector 203 in the three-dimensional space illustrated in FIG. 24 is 10%, and the determination unit 5a determines that the crack represented by the pixels with ON crack flags is not accompanied by lifting separation. The existence ratio of the step vector 204 in the three-dimensional space illustrated in FIG. 25 is 0%, and the determination unit 5a determines that the crack represented by the pixels with ON crack flags is not accompanied by lifting separation.

When the existence ratio has not been calculated for at least one of the step vectors (step S35: No), the determination unit 5a returns to step S34 to select the next step vector and calculate the existence ratio. When the calculation of existence ratio for all the step vectors has been completed (step S35: Yes), the determination unit 5a ends the process.

Note that the detection device 20a can be implemented by the same hardware configuration as the detection device 20 of the first embodiment.

As described above, according to the present embodiment, the detection device 20a generates a step vector from three-dimensional point group information obtained through laser measurement, generates three-dimensional information on pixels with ON crack flags and pixels located within a margin range from image information obtained through capturing simultaneously with the laser measurement, and determines the state of the crack on the basis of the existence ratio of the step vector in a three-dimensional space that includes pixels with ON crack flags and pixels within the margin range. As a result, as in the first embodiment, the detection device 20a can eliminate the need for a large amount of work time by human power, and can automatically determine whether a crack generated on the surface of a structure is merely a crack or a crack accompanied by lifting separation without depending on the experience and skill of the investigator. Furthermore, since the detection device 20a can determine whether a crack is accompanied by lifting separation without generating a crack vector, the determination method is easier than that of the first embodiment. Therefore, the processing time required for determination can be reduced.

Third Embodiment

In the first embodiment, the detection device 20 generates a crack vector from image information, generates a step vector from three-dimensional point group information, and compares the two vectors to determine whether the crack is accompanied by lifting separation. In a third embodiment, a description will be given of a case where the state of a crack is determined in a detection device without vectorizing a step obtained from three-dimensional point group information.

Figure 26:
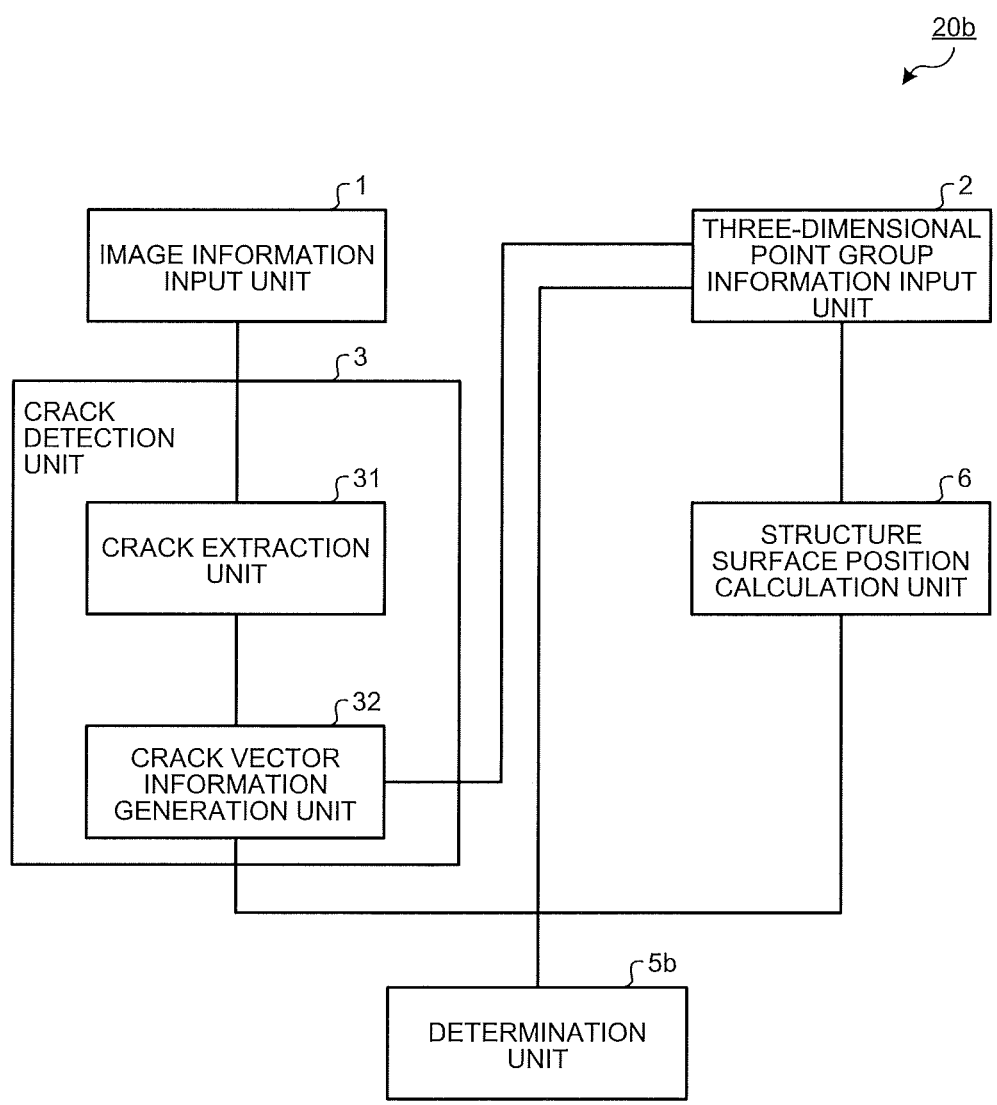
FIG. 26 is a block diagram illustrating an exemplary configuration of a detection device according to a third embodiment.

FIG. 26 is a block diagram illustrating an exemplary configuration of a detection device 20b according to the third embodiment. The detection device 20b is configured by replacing the step detection unit 4 and the determination unit 5 of the detection device 20 with a structure surface position calculation unit 6 and a determination unit 5b.

The structure surface position calculation unit 6 calculates the position of a structure surface by approximating the surface of a structure as a smooth surface from three-dimensional point group information input from the three-dimensional point group information input unit 2, for example, using smoothing processing.

The determination unit 5b determines the state of a crack by using crack vector information that is information on a deformation, information on the position of a structure surface, and three-dimensional point group information. Specifically, on the basis of a crack vector generated by the crack vector information generation unit 32, the determination unit 5b extracts, from the three-dimensional point group information input unit 2, three-dimensional point group information in a space within a specified range from the crack vector. The determination unit 5b classifies the extracted three-dimensional point group information into two groups of points using the crack vector as a boundary in the direction perpendicular to the structure surface position calculated by the structure surface position calculation unit 6. The determination unit 5b calculates the vertical distance between each point of the classified groups of points and the structure surface position, and calculates and stores the average vertical distance between each group of points and the structure surface position. The determination unit 5b performs the same process on all the crack vectors.

When the difference between the calculated average vertical distances of two groups of points adjacent to each other via a single crack vector from the structure surface position is equal to or greater than a specified threshold value, the determination unit 5b determines that there is a step around the crack on the structure surface represented by the crack vector at the boundary between the two groups of points. The determination unit 5b further determines the state of the crack, that is, determines whether the crack is accompanied by lifting separation, using information on the determined step. The determination unit 5b performs the same process on all the crack vectors.

Figure 27:
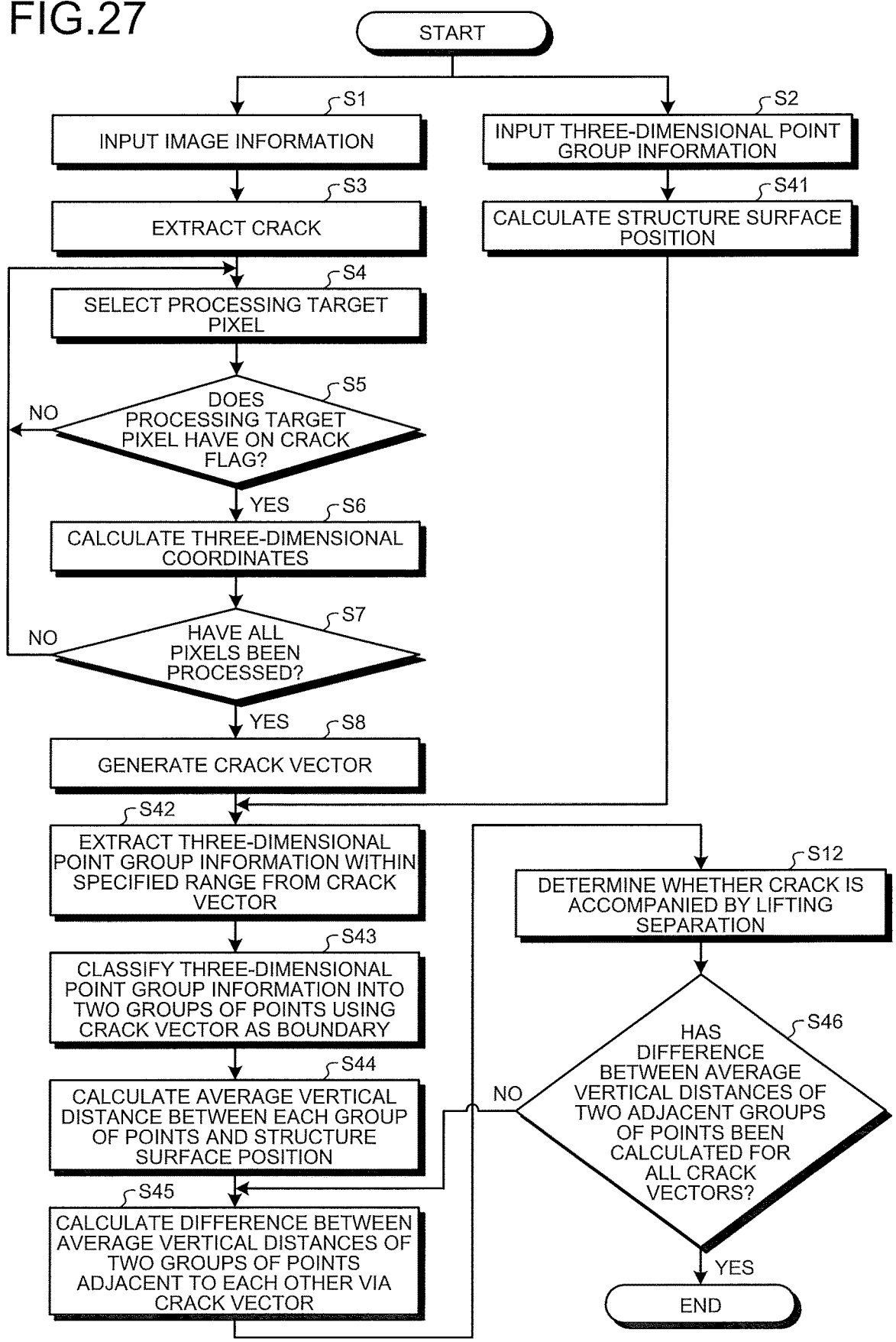
FIG. 27 is a flowchart illustrating a process of the detection device to determine the state of a detected crack according to the third embodiment.

Next, a description will be given of a process of the detection device 20b to determine whether a deformation detected on the surface of a structure is merely a crack or a crack accompanied by lifting separation. FIG. 27 is a flowchart illustrating a process of the detection device 20b to determine the state of a detected crack according to the third embodiment. The difference from the flowchart of the first embodiment illustrated in FIG. 2 will be described.

The structure surface position calculation unit 6 calculates a structure surface position from three-dimensional point group information input from the three-dimensional point group information input unit 2 using the technique of smoothing processing or the like (step S41).

On the basis of a crack vector, the determination unit 5b extracts, from the three-dimensional point group information input unit 2, three-dimensional point group information in a space within a specified range from the crack vector (step S42).

The determination unit 5b classifies the extracted three-dimensional point group information into two groups of points using the crack vector as a boundary in the direction perpendicular to the structure surface position (step S43).

The determination unit 5b calculates the vertical distance between each point of the groups of points and the structure surface position, and calculates the average vertical distance between each group of points and the structure surface position (step S44).

The determination unit 5b calculates the difference between the average vertical distances of two groups of points adjacent to each other via a single crack vector (step S45). On the basis of the calculated difference between the average vertical distances, the determination unit 5b determines whether the crack is accompanied by lifting separation (step S12).

Figure 28:
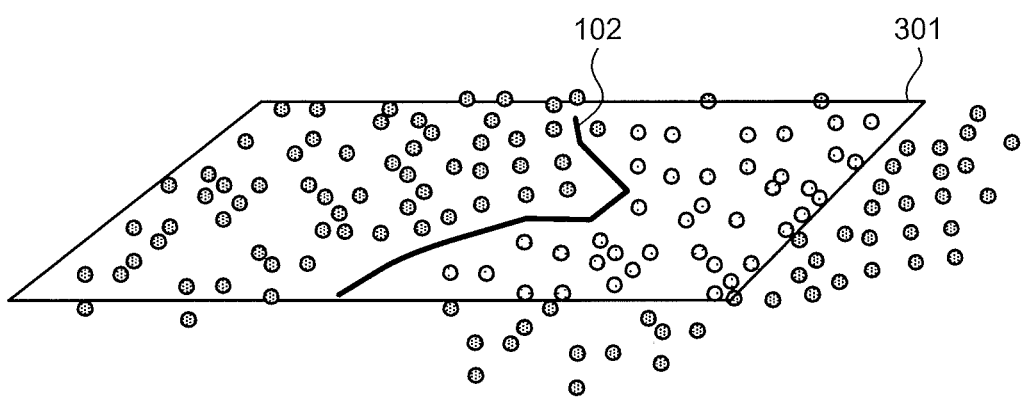
FIG. 28 is a diagram illustrating how three-dimensional point group information extracted from the three-dimensional point group information input unit is classified into two groups of points using a crack vector as a boundary in the determination unit according to the third embodiment, and illustrating an exemplary structure surface position.

FIG. 28 is a diagram illustrating how three-dimensional point group information extracted from the three-dimensional point group information input unit 2 is classified into two groups of points using a crack vector 102 as a boundary in the determination unit 5b according to the third embodiment, and illustrating an exemplary structure surface position 301. The determination unit 5b classifies the three-dimensional point group information extracted from the three-dimensional point group information input unit 2 into the left group of points and the right group of points using the crack vector 102 as a boundary. The determination unit 5b calculates the vertical distance between each point of the left group of points and the structure surface position 301, and calculates the average vertical distance (a) between the left group of points and the structure surface position. In a similar manner, the determination unit 5b calculates the vertical distance between each point of the right group of points and the structure surface position 301, and calculates the average vertical distance (−b) between the right group of points and the structure surface position. When the value of "(a)−(−b)", which is the difference between the average vertical distances of the two groups of points, is greater than a specified threshold value c, the determination unit 5b determines that the crack represented by the crack vector 102 is accompanied by lifting separation.

When the difference between the average vertical distances of two adjacent groups of points has not been calculated for at least one of the crack vectors (step S46: No), the determination unit 5b returns to step S45 to calculate the difference between the average vertical distances of two groups of points adjacent to each other via a single unprocessed crack vector. When the difference between the average vertical distances of two adjacent groups of points has been calculated for all the crack vectors (step S46: Yes), the determination unit 5b ends the process.

Note that the detection device 20b can be implemented by the same hardware configuration as the detection device 20 of the first embodiment.

As described above, according to the present embodiment, the detection device 20b calculates a structure surface position from three-dimensional point group information obtained through laser measurement, generates a crack vector from image information obtained through capturing simultaneously with the laser measurement, and determines the state of the crack using the difference between the average vertical distances of two groups of points defined by the crack vector from the structure surface position. As a result, as in the first embodiment, the detection device 20b can eliminate the need for a large amount of work time by human power, and can automatically determine whether a crack generated on the surface of a structure is merely a crack or a crack accompanied by lifting separation without depending on the experience and skill of the investigator. Furthermore, since the detection device 20b can determine whether a crack is accompanied by lifting separation without generating a step vector, the determination method is easier than that of the first embodiment. Therefore, the processing time required for determination can be reduced.

Although the present embodiment has been described in relation to the first embodiment, the present embodiment is also applicable to the second embodiment. In this case, since the detection device can determine whether a crack is accompanied by lifting separation without generating neither a crack vector nor a step vector, the determination method is much easier than those of the first and second embodiments. Therefore, the processing time required for determination can be further reduced.

Fourth Embodiment

In a fourth embodiment, a method of editing a crack vector in a detection device will be described. Although the present embodiment will be described in relation to the first embodiment, the present embodiment is also applicable to the third embodiment.

Figure 29:
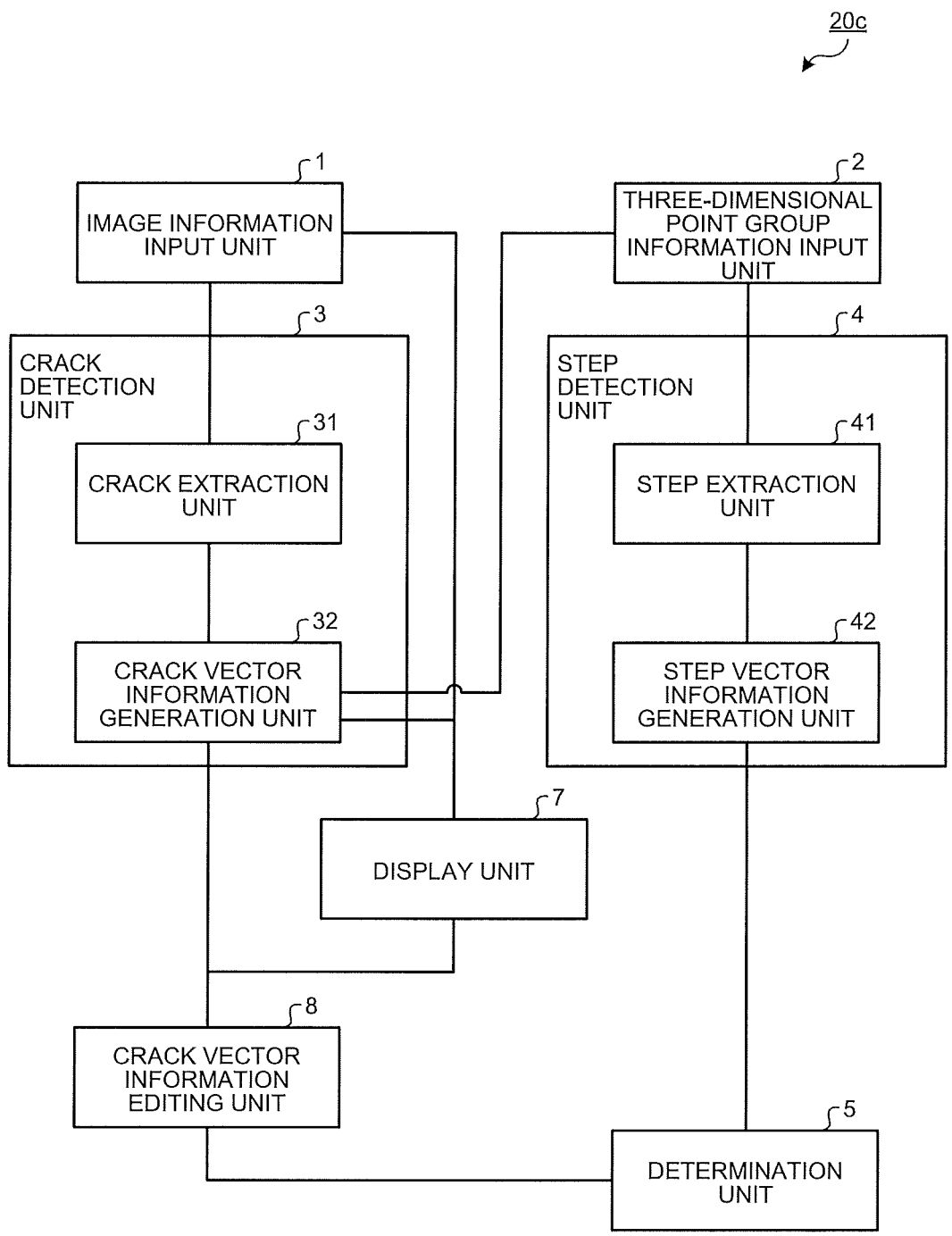
FIG. 29 is a block diagram illustrating an exemplary configuration of a detection device according to a fourth embodiment.

FIG. 29 is a block diagram illustrating an exemplary configuration of a detection device 20c according to the fourth embodiment. The detection device 20c includes a display unit 7 and a crack vector information editing unit 8 in addition to the components of the detection device 20.

The display unit 7 displays image information input from the image information input unit 1 and information on a crack vector generated by the crack vector information generation unit 32 in a format that a user can visually recognize. The display unit 7 may separately display image information and a crack vector, or superimpose image information and a crack vector. For example, the display unit 7 displays information on a display or the like mounted on a personal computer or the like constituting the detection device 20c. Note that the display unit 7 may include only a display control unit that displays a crack vector or the like on a display, and an external display or the like that is connected to the detection device 20c may be used as the display. On the display unit 7, for example, those illustrated in FIGS. 11 to 14 of the first embodiment, FIGS. 22 to 25 of the second embodiment, FIG. 28 of the third embodiment, and the like may be displayed.

The crack vector information editing unit 8 is an editing unit, and edits and corrects crack vector information generated by the crack vector information generation unit 32 in response to a user checking image information and a crack vector displayed on the display unit 7 and inputting a correction process such as adding or deleting a vertex of the crack vector and increasing or reducing the length of a line segment constituting the crack vector. The crack vector information editing unit 8 stores crack vector information obtained by correcting the content of crack vector information generated by the crack vector information generation unit 32 illustrated in FIG. 8. Crack vector information that has not been edited in the crack vector information editing unit 8 remains the same as the crack vector information generated by the crack vector information generation unit 32.

The determination unit 5 determines whether a crack generated on the surface of a structure is accompanied by lifting separation using crack vector information corrected by the crack vector information editing unit 8 and step vector information generated by the step vector information generation unit 42. The determination method in the determination unit 5 is the same as that in the first embodiment.

Figure 30:
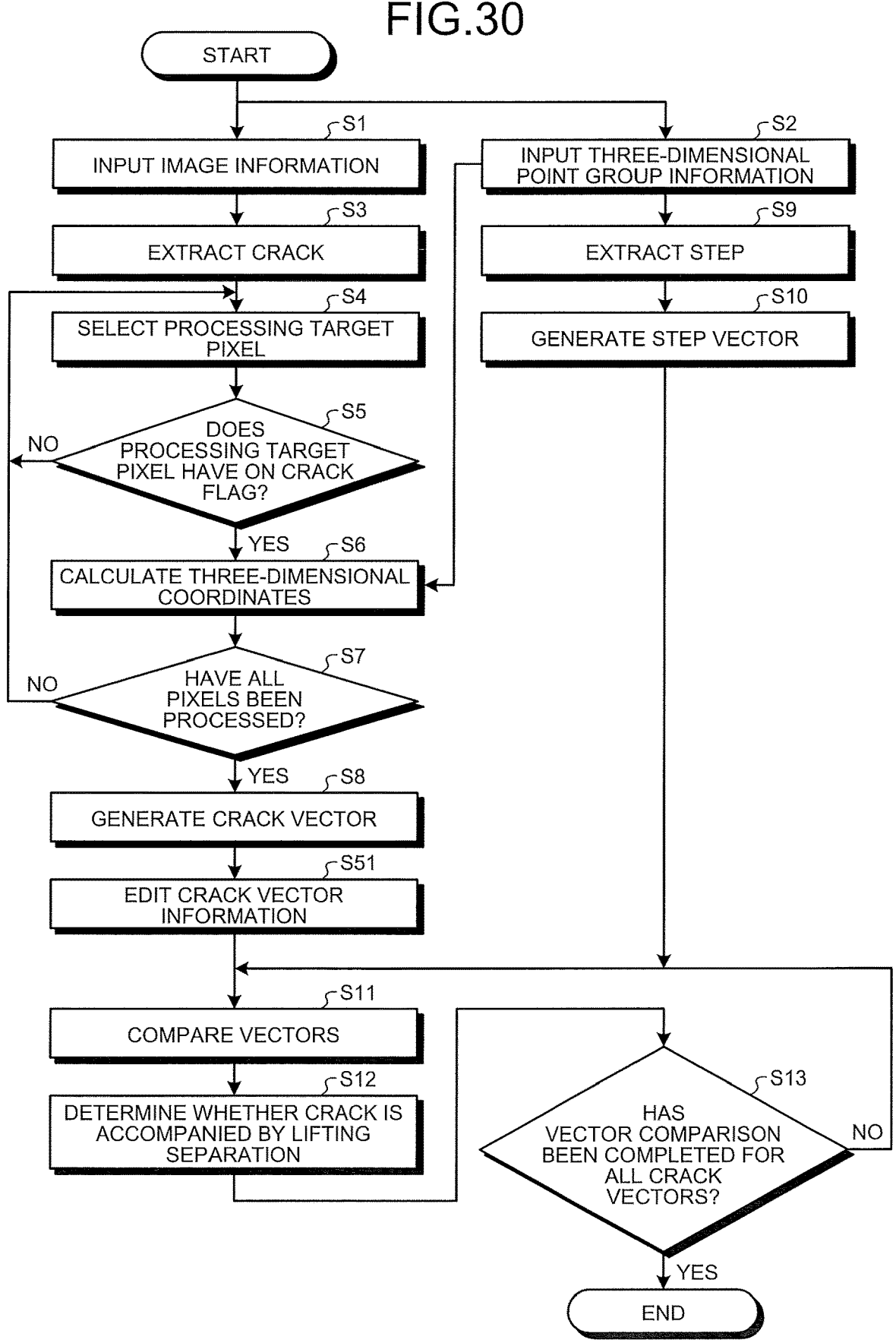
FIG. 30 is a flowchart illustrating a process of the detection device to determine the state of a detected crack according to the fourth embodiment.

Next, a description will be given of a process of the detection device 20c to determine whether a deformation detected on the surface of a structure is merely a crack or a crack accompanied by lifting separation. FIG. 30 is a flowchart illustrating a process of the detection device 20c to determine the state of a detected crack according to the fourth embodiment. The difference from the flowchart of the first embodiment illustrated in FIG. 2 will be described.

In the detection device 20c, the crack vector information editing unit 8 accepts a correction process from a user who has checked image information and a crack vector displayed on the display unit 7, and edits crack vector information generated in step S8 (step S51). In the detection device 20c, edited crack vector information may be stored in a storage unit inside the crack vector information editing unit 8, or may be stored in an external storage unit (not illustrated). Other processes of the detection device 20c are the same as those in the first embodiment.

For the hardware configuration of the detection device 20c, a display or the like is necessary in the display unit 7, but other components can be implemented by the same configuration as the detection device 20 of the first embodiment.

As described above, according to the present embodiment, the detection device 20c enables a user to check image information and a crack vector and to edit information on the crack vector when the user determines that the crack vector generated for the image information does not accurately represent the actual crack. As a result, the detection device 20c obtains the same effects as the detection device 20 of the first embodiment, and can have an improved accuracy of automatically determining whether a crack generated on the surface of a structure is merely a crack or a crack accompanied by lifting separation by using more accurate information on a crack vector as input information.

Fifth Embodiment

In a fifth embodiment, a description will be given of a case where information on a crack vector, information on a step vector, and the like are displayed on a detection device. Although the present embodiment will be described in relation to the first embodiment, the present embodiment is also applicable to the second to fourth embodiments.

Figure 31:
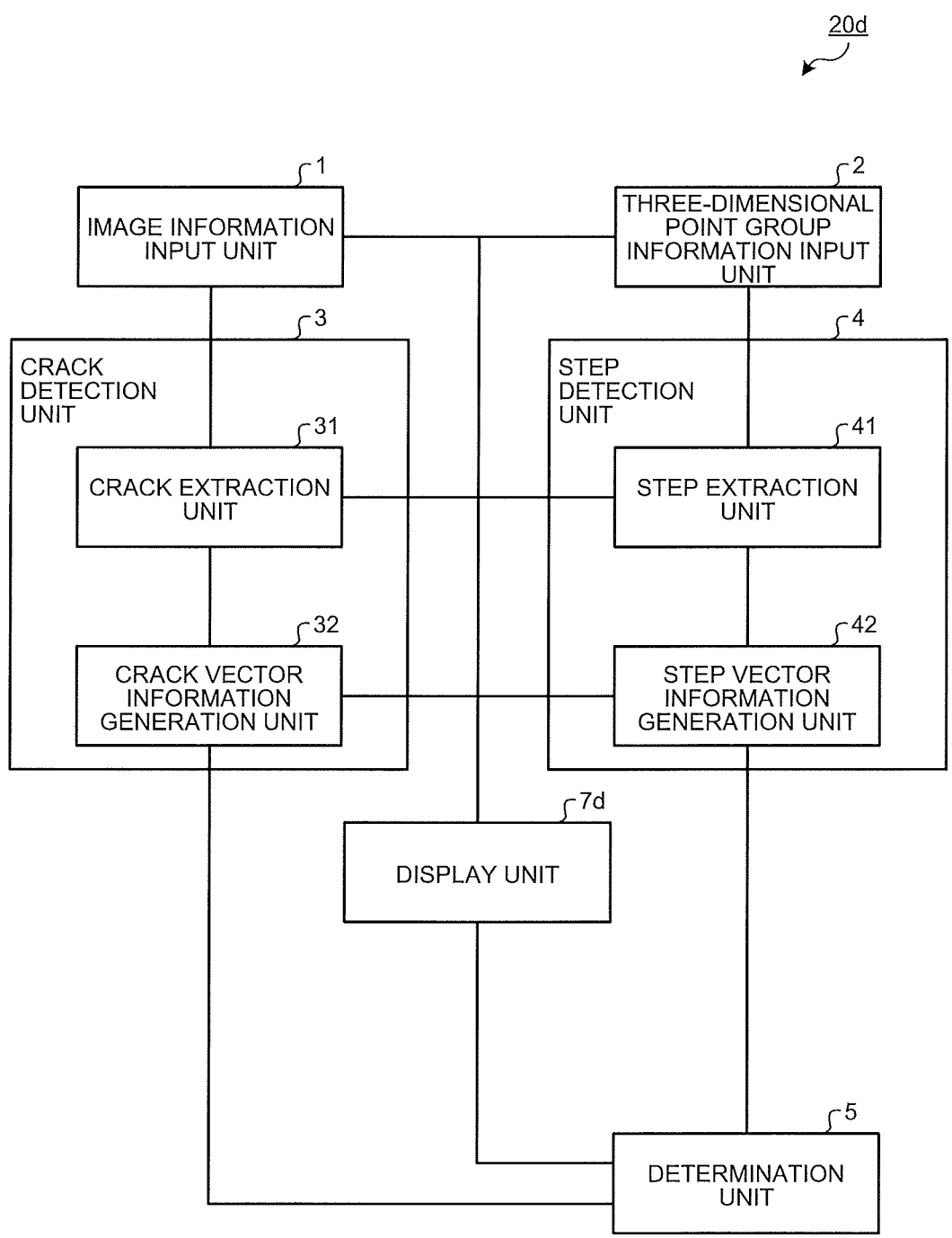
FIG. 31 is a block diagram illustrating an exemplary configuration of a detection device according to a fifth embodiment.

FIG. 31 is a block diagram illustrating an exemplary configuration of a detection device 20d according to the fifth embodiment. The detection device 20d includes a display unit 7d in addition to the components of the detection device 20.

The display unit 7d displays, in a format that a user can visually recognize, image information input from the image information input unit 1, crack image information generated by the crack extraction unit 31, crack vector information generated by the crack vector information generation unit 32, three-dimensional point group information input from the three-dimensional point group information input unit 2, three-dimensional point group information with step flags generated by the step extraction unit 41, step vector information generated by the step vector information generation unit 42, and lifting separation crack information generated by the determination unit 5. For example, the display unit 7*d* displays information on a display or the like mounted on a personal computer or the like constituting the detection device 20*d*. Note that the display unit 7*d* may include only a display control unit that displays a crack vector or the like on a display, and an external display or the like that is connected to the detection device 20*d* may be used as the display. The display unit 7*d* displays, for example, those illustrated in FIGS. 11 to 14 of the first embodiment, FIGS. 22 to 25 of the second embodiment, FIG. 28 of the third embodiment, and the like. In a case where the present embodiment is applied to the fourth embodiment, the display unit 7*d* may also serve as the display unit 7.

For example, the display unit 7*d* displays three-dimensional point group information with step flags by applying a color that indicates a step to points with ON step flags and superimposing a crack vector thereon, thereby assisting a user in intuitively recognizing the positional relation between the step and the crack. When superimposing three-dimensional point group information with step flags and a crack vector, the display unit 7*d* can display the respective images on different layers to turn on and off each image, making it easier for a user to see the images. The display unit 7*d* may superimpose a crack vector and a step vector or may display pixels of crack image information with ON crack flags in a color indicating a crack and displaying the step vector thereon. The display unit 7*d* may also display pixels of image information with ON crack flags in a color indicating a crack, and display three-dimensional point group information with step flags thereon by applying a color indicating a step to points with ON step flags. The display unit 7*d* may also display all pieces of information on different layers, accept a user's selection, and display only necessary pieces of information. Note that on the display unit 7*d*, each piece of information may be displayed three-dimensionally, or both a crack and a step may be displayed using two-dimensionally developed information.

With respect to lifting separation crack information generated by the determination unit 5, the display unit 7*d* can indicate which cracks and steps are associated with each other and determined to be lifting separation by superimposing image information and three-dimensional point group information as input information.

The flowchart illustrating a process of the detection device 20*d* of the fifth embodiment to determine the state of a detected crack is the same as the flowchart of the first embodiment illustrated in FIG. 2.

For the hardware configuration of the detection device 20*d*, a display or the like is necessary in the display unit 7*d*, but other components can be implemented by the same configuration as the detection device 20 of the first embodiment.

As described above, according to the present embodiment, the detection device 20*d* can allocate all of image information, three-dimensional point group information, crack image information, crack vector information, three-dimensional point group information with step information, step vector information, and lifting separation crack information to different layers for superimposed display. As a result, the detection device 20*d* obtains the same effects as the detection device 20 of the first embodiment, and enables a user to recognize the state of a crack by displaying information such that the user can check the positional relation between the crack and the step.

Sixth Embodiment

In a sixth embodiment, a method of adding a similarity to lifting separation crack information in a detection device will be described. Although the present embodiment will be described in relation to the first embodiment, the present embodiment is also applicable to the second to fifth embodiments.

Figure 32:
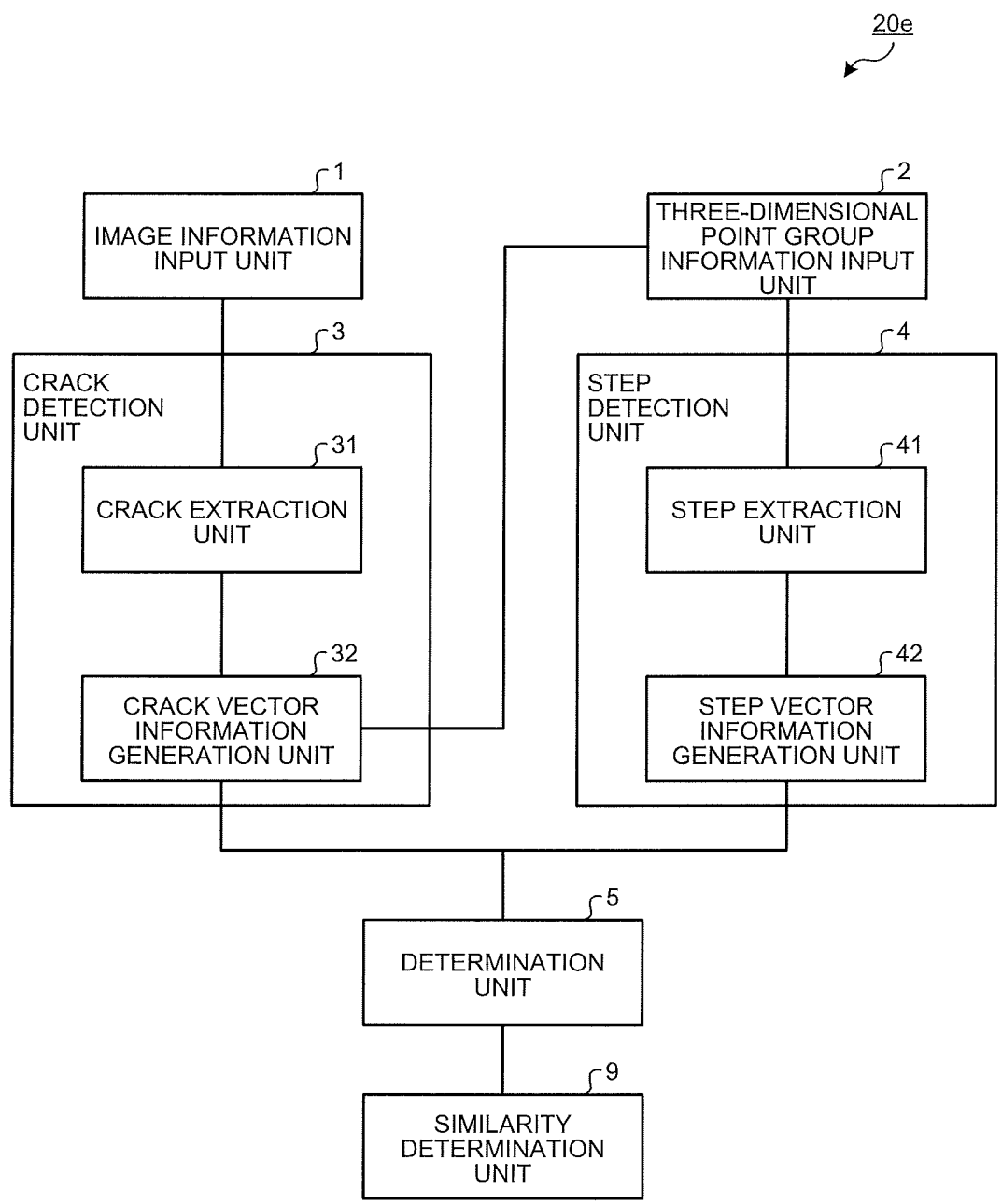
FIG. 32 is a block diagram illustrating an exemplary configuration of a detection device according to a sixth embodiment.

FIG. 32 is a block diagram illustrating an exemplary configuration of a detection device 20*e* according to the sixth embodiment. The detection device 20*e* includes a similarity determination unit 9 in addition to the components of the detection device 20.

The similarity determination unit 9 determines the similarity between a deformation and a step using a determination result of the state of a crack in the determination unit 5. For example, the similarity determination unit 9 further compares the shapes of a crack vector and a step vector or the like, regardless of the distance between the vectors, using, for example, the distance between line segments of the crack vector and the step vector and the ratio of points having an inter-segment distance equal to or less than the threshold value $\gamma$ calculated by the determination unit 5 of the first embodiment, thereby determining the similarity between the crack vector and the step vector. Alternatively, for example, the similarity determination unit 9 further compares the shape represented by pixels with ON crack flags and the shape of a step vector or the like using, for example, the existence ratio of the step vector in a three-dimensional space that includes pixels of a crack and pixels within a margin range calculated by the determination unit 5*a* of the second embodiment, thereby determining the similarity between the pixels with ON crack flags and the step vector. The similarity determination unit 9 stores information on the determined similarity in association with lifting separation crack information that is the result of determination by the determination unit 5.

Figure 33:
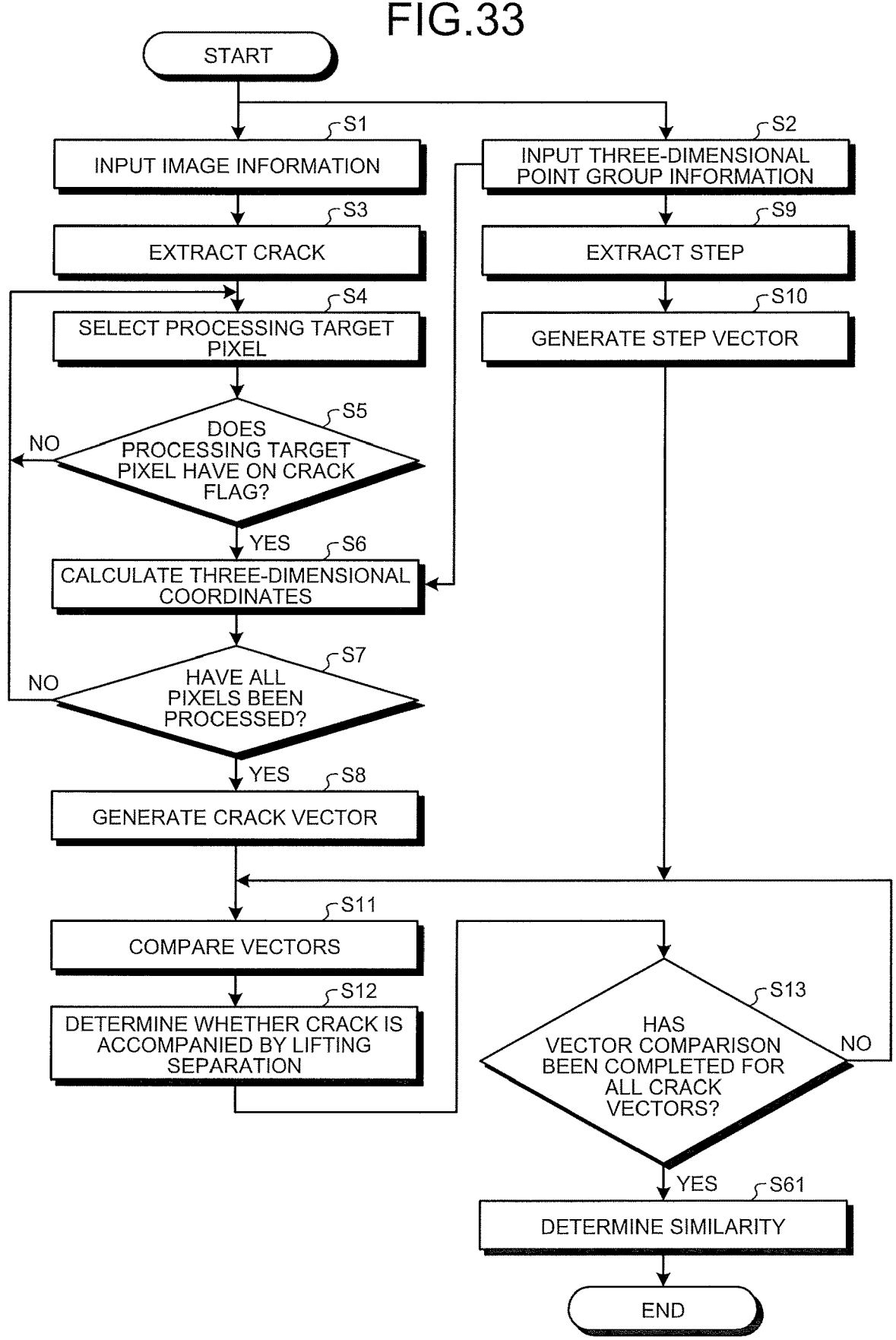
FIG. 33 is a flowchart illustrating a process of the detection device to determine the state of a detected crack according to the sixth embodiment.

Next, a description will be given of a process of the detection device 20*e* to determine whether a deformation detected on the surface of a structure is merely a crack or a crack accompanied by lifting separation. FIG. 33 is a flowchart illustrating a process of the detection device 20*e* to determine the state of a detected crack according to the sixth embodiment. The difference from the flowchart of the first embodiment illustrated in FIG. 2 will be described.

The processing of steps S1 to S13 performed by the detection device 20*e* is the same as that in the flowchart of the first embodiment illustrated in FIG. 2. Upon completion of the processing in the determination unit 5, the similarity determination unit 9 determines the similarity between a crack vector and a step vector (step S61).

Figure 34:
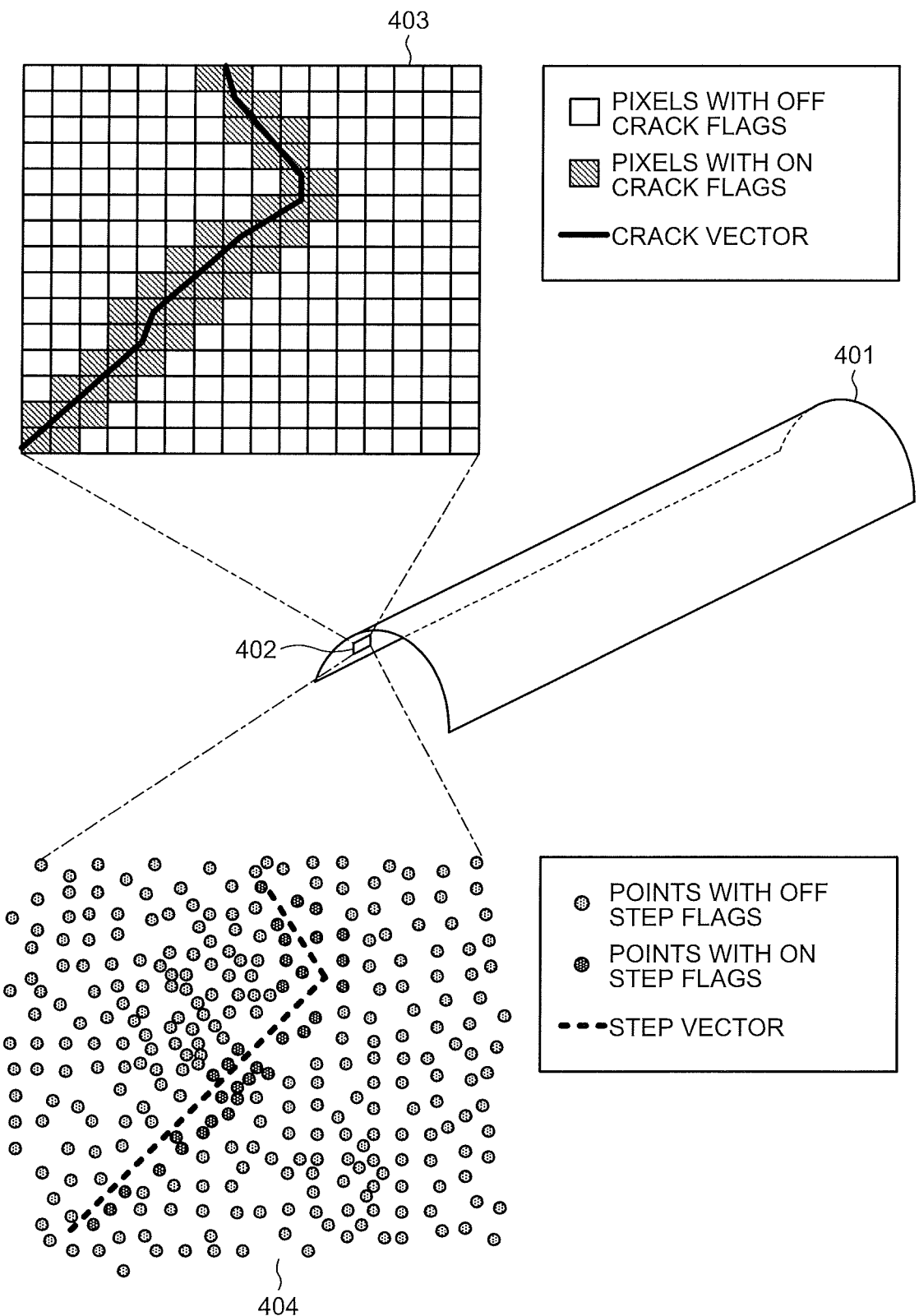
FIG. 34 is a diagram illustrating an exemplary structure targeted for determination of the state of a crack and exemplary information obtained through measurement in the detection device according to the sixth embodiment.

FIG. 34 is a diagram illustrating an exemplary structure targeted for determination of the state of a crack and exemplary information obtained through measurement in the detection device 20*e* according to the sixth embodiment. The following description is based on the assumption that the structure targeted for detection of the state of a crack is a tunnel 401, and the state of a crack is detected on a wall surface part 402 within a measured range. As in the first embodiment, the detection device 20*e* generates a crack vector from pixels with ON crack flags on the basis of image information 403 captured with a digital camera or the like. As in the first embodiment, the detection device 20e also generates a step vector from points with ON step flags on the basis of three-dimensional point group information 404 measured with a high-density laser scanner or the like. FIGS. 35 to 38 illustrate a crack vector obtained from the image information 403 and a step vector obtained from the three-dimensional point group information 404 superimposed on each other.

FIGS. 35 to 38 are diagrams illustrating exemplary images for comparing the crack vector and the step vector in the similarity determination unit 9 according to the sixth embodiment. The similarity determination unit 9 determines the similarity in position on the basis of inter-segment distances between vectors calculated by the determination unit 5 in the first embodiment. The similarity determination unit 9 also determines the similarity in shape using variations in the inter-segment distances. For example, even when there is a distance between a crack vector and a step vector, the similarity determination unit 9 determines that the similarity in shape is high if the inter-segment distances are equal to each other. The similarity determination unit 9 further determines an overall similarity from the position similarity and the shape similarity. The similarity determination unit 9 may take the average of the position similarity and the shape similarity as the overall similarity, or may designate the similarity with a lower value as the overall similarity.

Note that the crack vector 101 and the step vectors 201 to 204 in FIGS. 35 to 38 are the same as the crack vector 101 and the step vectors 201 to 204 in FIGS. 11 to 14 described in the first embodiment. In this case, the similarity determination unit 9 determines the similarity in position on the basis of the ratio of points having an inter-segment distance equal to or less than the threshold value γ calculated by the determination unit 5.

Figure 35:
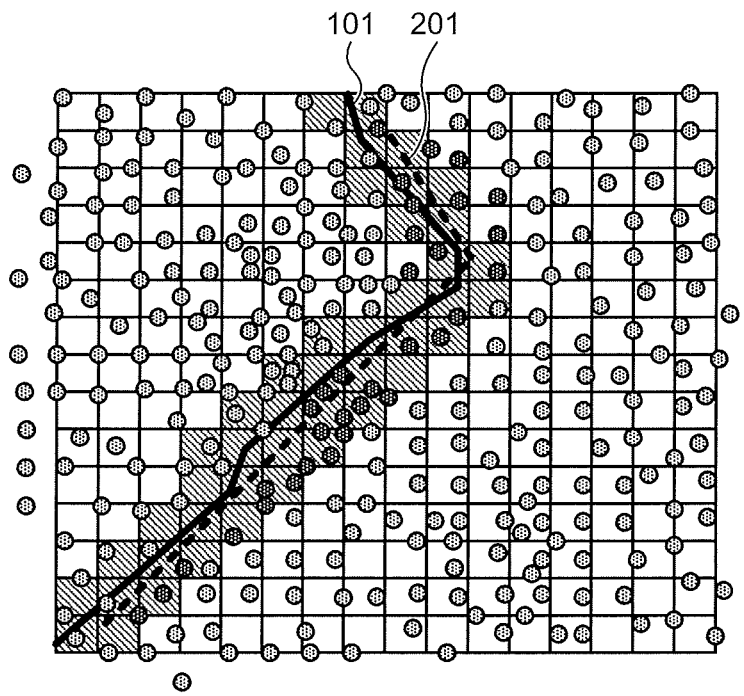
FIG. 35 is a diagram illustrating a first exemplary image for comparing the crack vector and the step vector in a similarity determination unit according to the sixth embodiment.

When comparing the crack vector 101 and the step vector 201 illustrated in FIG. 35, the similarity determination unit 9 determines that the position similarity is "five" on the basis of the result of calculating inter-segment distances in the determination unit 5, and determines that the shape similarity is "five" on the basis of variations in the inter-segment distances. Since the values are both "five", the similarity determination unit 9 determines that the overall similarity is "five".

Figure 36:
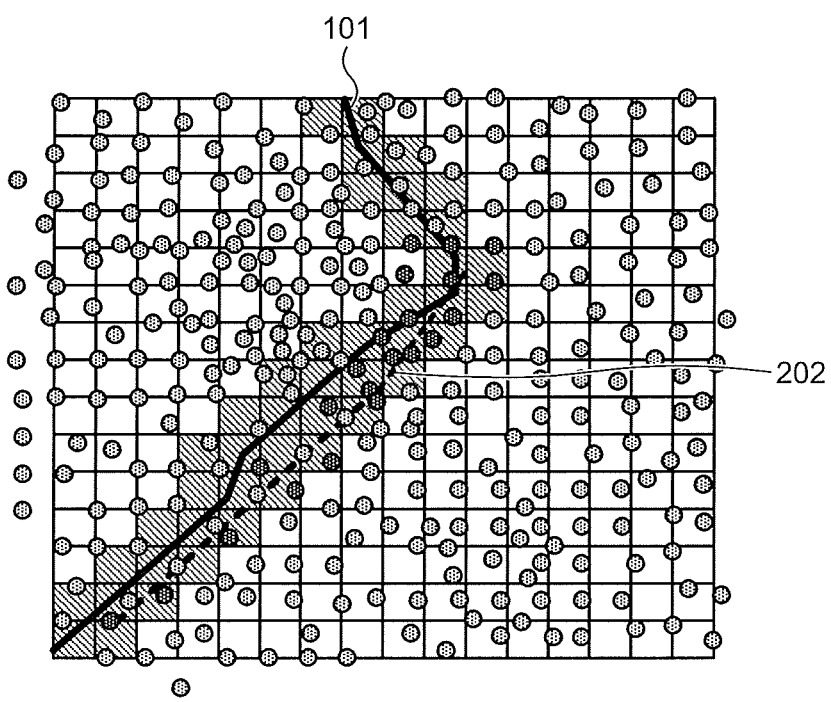
FIG. 36 is a diagram illustrating a second exemplary image for comparing the crack vector and the step vector in the similarity determination unit according to the sixth embodiment.

When comparing the crack vector 101 and the step vector 202 illustrated in FIG. 36, the similarity determination unit 9 determines that the position similarity is "five" on the basis of the result of calculating inter-segment distances in the determination unit 5, and determines that the shape similarity is "four" on the basis of variations in the inter-segment distances. Since the lower value is "four", the similarity determination unit 9 determines that the overall similarity is "four".

Figure 37:
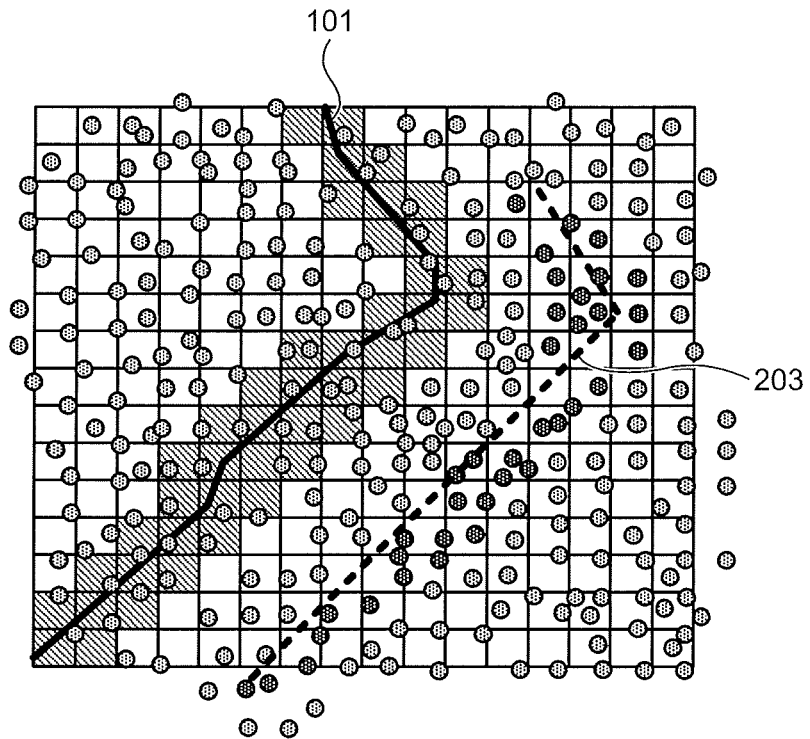
FIG. 37 is a diagram illustrating a third exemplary image for comparing the crack vector and the step vector in the similarity determination unit according to the sixth embodiment.

When comparing the crack vector 101 and the step vector 203 illustrated in FIG. 37, the similarity determination unit 9 determines that the position similarity is "two" on the basis of the result of calculating inter-segment distances in the determination unit 5, and determines that the shape similarity is "four" on the basis of variations in the inter-segment distances. Since the lower value is "two", the similarity determination unit 9 determines that the overall similarity is "two".

Figure 38:
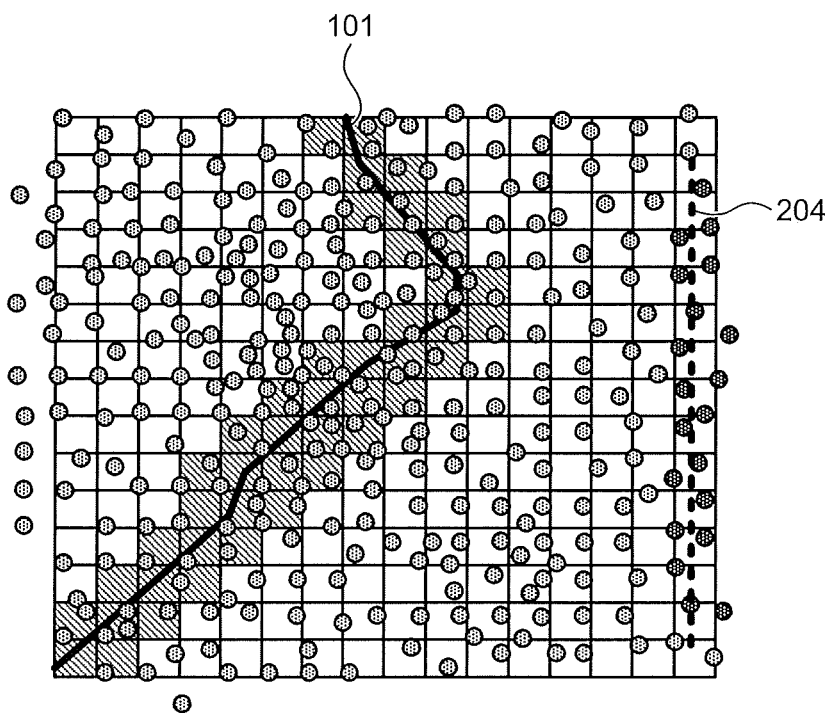
FIG. 38 is a diagram illustrating a fourth exemplary image for comparing the crack vector and the step vector in the similarity determination unit according to the sixth embodiment.

When comparing the crack vector 101 and the step vector 204 illustrated in FIG. 38, the similarity determination unit 9 determines that the position similarity is "one" on the basis of the result of calculating inter-segment distances in the determination unit 5, and determines that the shape similarity is "one" on the basis of variations in the inter-segment distances. Since the values are both "one", the similarity determination unit 9 determines that the overall similarity is "one".

Figure 39:
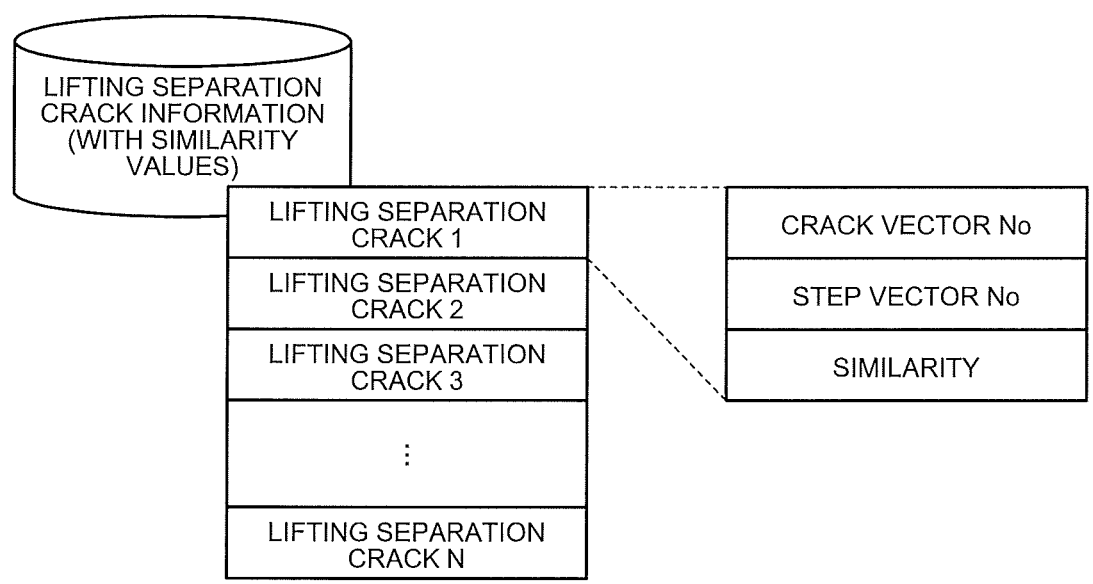
FIG. 39 is a diagram illustrating the content obtained by adding similarity values to lifting separation crack information indicating cracks determined to be accompanied by lifting separation in the similarity determination unit according to the sixth embodiment.

The similarity determination unit 9 stores information on the determined similarity in association with lifting separation crack information that is the result of determination by the determination unit 5. FIG. 39 is a diagram illustrating the content obtained by adding similarity values to lifting separation crack information indicating cracks determined to be accompanied by lifting separation in the similarity determination unit 9 according to the sixth embodiment. The lifting separation crack information with similarity values illustrated in FIG. 39 is obtained by adding similarity information to each lifting separation crack of the lifting separation crack information illustrated in FIG. 15. The lifting separation crack information with similarity values illustrated in FIG. 39 may be stored in a storage unit inside the similarity determination unit 9, or may be stored in an external storage unit (not illustrated).

The higher the overall similarity is, the more likely it is that the crack represented by the corresponding crack vector is accompanied by lifting separation. On the other hand, the lower the overall similarity is, the less relevant the crack represented by the corresponding crack vector is to the step and the less likely it is that the crack represented by the corresponding crack vector is accompanied by lifting separation. The similarity determination unit 9 may notify a user of the determination content for a lifting separation crack with a high overall similarity. For example, in a case where the display unit 7d is provided as in the fifth embodiment, the similarity determination unit 9 may notify a user of the content of the overall similarity via the display unit 7d. In the above-described case, five levels of similarity are set for each of the position similarity, shape similarity, and overall similarity. Alternatively, more levels of similarity may be set. In this case, the similarity determination unit 9 may change the way of notifying a user and the content of notification in accordance with the level of the overall similarity.

Note that the detection device 20e can be implemented by the same hardware configuration as the detection device 20 of the first embodiment.

As described above, according to the present embodiment, the detection device 20e determines the similarity between a crack vector and a step vector, and quantifies the similarity. As a result, the detection device 20e obtains the same effects as the detection device 20 of the first embodiment, and enables a user to check a similarity value to intuitively recognize the safety of a detected crack.

Seventh Embodiment

In the first to sixth embodiments, it is determined whether a detected crack is merely a crack or a crack accompanied by lifting separation by using image information digitally captured with a digital camera or the like and three-dimensional point group information measured with a high-density laser scanner. In a seventh embodiment, a description will be given of a case where a detection device further uses the result of detecting an internal deformation with a radar. Although the present embodiment will be described in relation to the first embodiment, the present embodiment is also applicable to the second to sixth embodiments.

Figure 40:
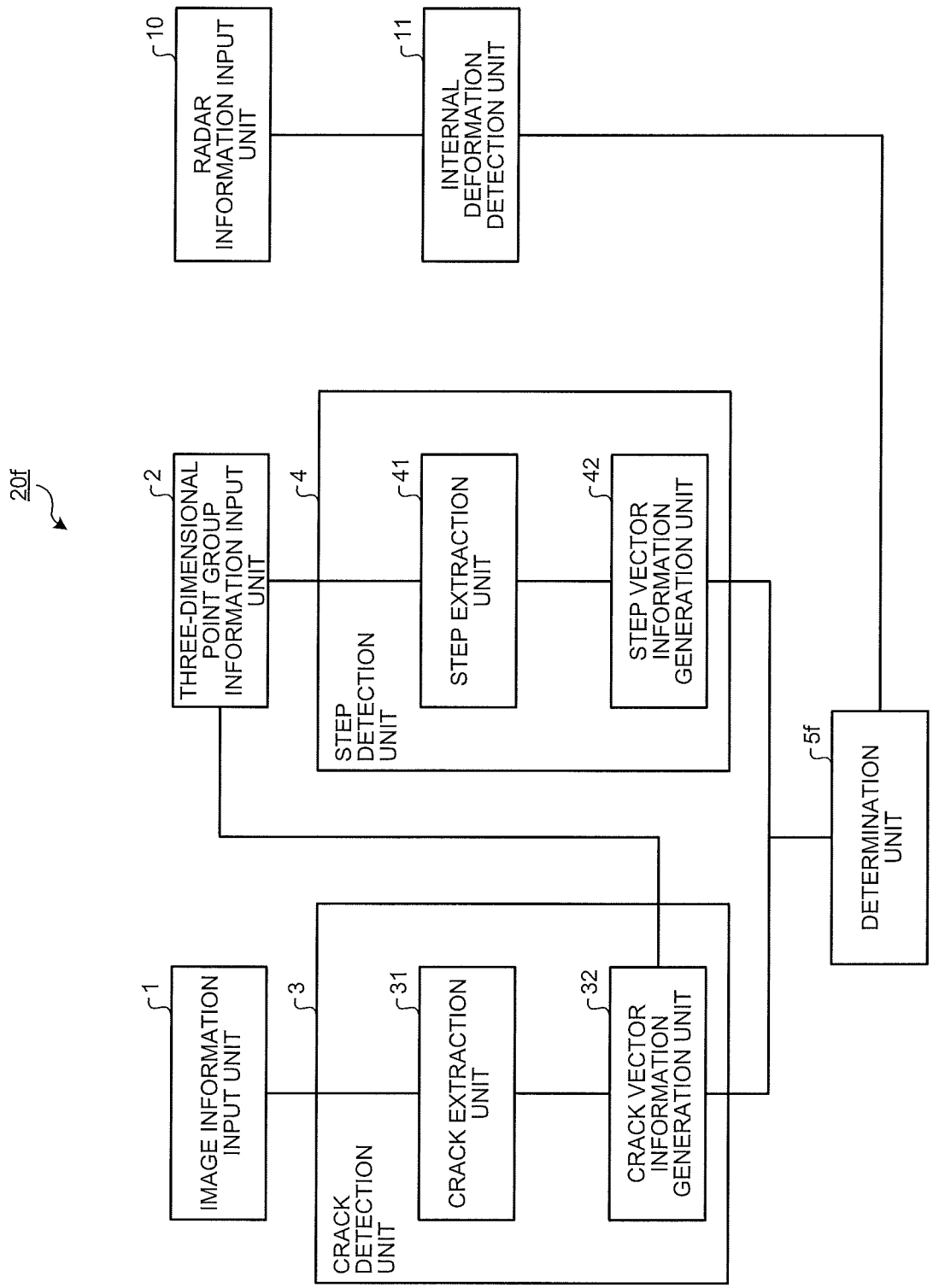
FIG. 40 is a block diagram illustrating an exemplary configuration of a detection device according to a seventh embodiment.

FIG. 40 is a block diagram illustrating an exemplary configuration of a detection device 20f according to the seventh embodiment. The detection device 20*f* is configured by replacing the determination unit 5 of the detection device 20 with a determination unit 5*f* and adding a radar information input unit 10 and an internal deformation detection unit 11.

The radar information input unit 10 receives an input of radar information on the inside of a structure. The radar information input unit 10 receives an input of radar information measured and acquired with a radar, and the radar information input unit 10 may be a radar itself. The radar information input unit 10 may be a data reading device that reads data on radar information measured and acquired with a radar via a recording medium, or a communication device that receives information measured and acquired with a radar by wired communication or wireless communication.

The internal deformation detection unit 11 detects a cavity as a deformation inside a structure from radar information input by the radar information input unit 10, and stores the position of the detected cavity. The method of detecting a cavity in the internal deformation detection unit 11 is not particularly limited.

On the basis of the three-dimensional positional information on crack and step vectors recorded in lifting separation crack information and the positional information on a cavity detected by the internal deformation detection unit 11, the determination unit 5*f* calculates the distance between the crack vector and the cavity and the distance between the step vector and the cavity. When the calculated distance is equal to or less than a specified threshold value, the determination unit 5*f* determines that the crack is accompanied by the cavity. Note that the determination unit 5*f* may calculate only the distance between either of the vectors and the cavity. In addition, in the same way as the determination unit 5 of the first embodiment, the determination unit 5*f* may compare a crack vector and a step vector to determine whether the crack is accompanied by lifting separation, and may further obtain the distance to a cavity using one or two vectors as described above to determine whether the crack is accompanied by the cavity.

Next, a description will be given of a process of the detection device 20*f* to determine whether a deformation detected on the surface of a structure is merely a crack or a crack accompanied by lifting separation. FIG. 41 is a flowchart illustrating a process of the detection device 20*f* to determine the state of a detected crack according to the seventh embodiment. The difference from the flowchart of the first embodiment illustrated in FIG. 2 will be described.

In the detection device 20*f*, the radar information input unit 10 receives an input of radar information on the inside of a structure measured, for example, with a radar (step S71).

The internal deformation detection unit 11 detects a cavity inside the structure from the radar information input from the radar information input unit 10 (step S72).

In step S12, the determination unit 5*f* determines whether a crack is accompanied by lifting separation. Further, on the basis of the three-dimensional positional information on crack and step vectors and the positional information on the cavity, the determination unit 5*f* calculates the distance between the crack vector and the cavity and the distance between the step vector and the cavity, or the distance between either of the vectors and the cavity (step S73). Note that the determination unit 5*f* may skip the processing of steps S11 and S12. Further, on the basis of the calculated distance, the determination unit 5*f* determines whether the crack represented by the crack vector is accompanied by the cavity (step S74).

Note that the detection device 20*f* can be implemented by the same hardware configuration as the detection device 20 of the first embodiment. In this case, the radar information input unit 10 is implemented by a measuring device or an interface circuit that acquires data on radar information. The internal deformation detection unit 11 is implemented by a processing circuitry.

As described above, according to the present embodiment, the detection device 20*f* combines three-dimensional point group information obtained through laser measurement, image information captured simultaneously with the laser measurement, and internal cavity information obtained through radar measurement to determine the state of the crack represented by a crack vector. As a result, the detection device 20*f* can automatically determine whether a crack generated on the surface of a structure is merely a crack or a crack accompanied by lifting separation, and can further automatically determine whether the crack is accompanied by a cavity.

The configurations described in the above-mentioned embodiments indicate examples of the content of the present invention. The configurations can be combined with another well-known technique, and part of the configurations can be omitted or modified within a range not departing from the scope of the present invention.

REFERENCE SIGNS LIST 1 image information input unit; 2 three-dimensional point group information input unit; 3, 3*a* crack detection unit; 4 step detection unit; 5, 5*a*, 5*b*, 5*f* determination unit; 6 structure surface position calculation unit; 7, 7*d* display unit; 8 crack vector information editing unit; 9 similarity determination unit; radar information input unit; 11 internal deformation detection unit; 20, 20*a*, 20*b*, 20*c*, 20*d*, 20*e*, 20*f* detection device; 31 crack extraction unit; 32 crack vector information generation unit; 33 crack three-dimensional information generation unit; 41 step extraction unit; 42 step vector information generation unit.

The invention claimed is:

1. A detection device comprising:
   a deformation detector to extract a crack on a surface of a structure from image information on the structure and generate vector information on the extracted crack using three-dimensional point group information on the surface of the structure measured with a laser;
   a step detector to extract a step on the surface of the structure from the three-dimensional point group information and generate vector information on the extracted step; and
   a determiner to calculate, using the vector information on the crack that is information on the crack and the vector information on the step that is information on the step, an inter-segment distance between each line segment of a vector indicated by the vector information on the crack and a line segment, nearest to the each line segment, of a vector indicated by the vector information on the step, and determine a state of the crack on a basis of a ratio of a point of the vector information on a single crack having the inter-segment distance to the vector information on a corresponding step less than a specified threshold value.

2. A detection device comprising:
   a deformation detector to extract a crack on a surface of a structure from image information on the structure and generate three-dimensional information for a pixel of the crack and a pixel located within a specified range from the pixel of the crack, using three-dimensional point group information on the surface of the structure measured with a laser;
a step detector to extract a step on the surface of the structure from the three-dimensional point group information and generate vector information on the extracted step; and
a determiner to generate, using the three-dimensional information on the crack that is information on the crack and the vector information on the step that is information on the step, a three-dimensional space that includes all pixels of the three-dimensional information on the crack and determine a state of the crack on a basis of a ratio of a vector indicated by the vector information on the step existing in the three-dimensional space.

3. The detection device according to claim 1, comprising a display to display the image information, the information on the crack, the three-dimensional point group information, the information on the step, and a determination result of the state of the crack in the determiner.

4. A detection device comprising:
a deformation detector to extract a crack on a surface of a structure from image information on the structure and generate vector information on the extracted crack using three-dimensional point group information on the surface of the structure measured with a laser;
a structure surface position calculator to calculate a position of the surface of the structure from the three-dimensional point group information; and
a determiner to extract, using the vector information on the crack that is information on the crack, information on the position of the surface of the structure, and the three-dimensional point group information, three-dimensional point group information in a space within a specified range from the crack, classify the extracted three-dimensional point group information into two groups of points using the crack as a boundary in a direction perpendicular to the position of the surface of the structure, calculate a vertical distance between each point of the classified groups of points and the position of the surface of the structure, calculate an average vertical distance for each of the groups of points, and determine a state of the crack on a basis of a difference between the average vertical distances for the groups of points.

5. The detection device according to claim 1, comprising:
a display to display the image information and the vector information on the crack; and
an editor to accept an operation from a user and correct the vector information on the crack, wherein
the determiner determines the state of the crack using the vector information on the crack corrected by the editor.

6. The detection device according to claim 2, comprising a similarity determiner to determine a similarity between the crack and the step using a determination result of the state of the crack in the determiner and display determination content on the display.

7. The detection device according to claim 1, comprising an internal deformation detector to detect a crack inside the structure from radar information, wherein
the determiner further determines a state of the crack using information on the crack inside the structure detected by the internal deformation detector.

8. The detection device according to claim 2, comprising a display to display the image information, the information on the crack, the three-dimensional point group information, the information on the step, and a determination result of the state of the crack in the determiner.

9. The detection device according to claim 4, comprising:
a display to display the image information and the vector information on the crack; and
an editor to accept an operation from a user and correct the vector information on the crack, wherein
the determiner determines the state of the crack using the vector information on the crack corrected by the editor.

10. The detection device according to claim 8, comprising a similarity determiner to determine a similarity between the crack and the step using a determination result of the state of the crack in the determiner and display determination content on the display.

11. The detection device according to claim 5, comprising a similarity determiner to determine a similarity between the crack and the step using a determination result of the state of the crack in the determiner and display determination content on the display.

12. The detection device according to claim 9, comprising a similarity determiner to determine a similarity between the crack and the step using a determination result of the state of the crack in the determiner and display determination content on the display.

13. The detection device according to claim 2, comprising an internal deformation detector to detect a crack inside the structure from radar information, wherein
the determiner further determines a state of the crack using information on the crack inside the structure detected by the internal deformation detector.

14. The detection device according to claim 4, comprising an internal deformation detector to detect a crack inside the structure from radar information, wherein
the determiner further determines a state of the crack using information on the crack inside the structure detected by the internal deformation detector.

* * * * *